United States Patent
Uchino

(10) Patent No.: US 10,221,024 B2
(45) Date of Patent: Mar. 5, 2019

(54) SHEET TRANSPORT APPARATUS AND IMAGE RECORDING APPARATUS

(71) Applicant: BROTHER KOGYO KABUSHIKI KAISHA, Nagoya-shi, Aichi-ken (JP)

(72) Inventor: Yuta Uchino, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/959,874

(22) Filed: Apr. 23, 2018

(65) Prior Publication Data

US 2018/0305143 A1    Oct. 25, 2018

Related U.S. Application Data

(63) Continuation of application No. 15/469,211, filed on Mar. 24, 2017, now Pat. No. 9,950,882, which is a (Continued)

(30) Foreign Application Priority Data

Mar. 29, 2013 (JP) .................................. 2013-073332
Dec. 6, 2013 (JP) .................................. 2013-253439

(51) Int. Cl.
*B65H 1/02* (2006.01)
*B41J 29/02* (2006.01)
(Continued)

(52) U.S. Cl.
CPC ................ *B65H 1/02* (2013.01); *B41J 29/02* (2013.01); *B41J 29/13* (2013.01); *B65H 3/0653* (2013.01);
(Continued)

(58) Field of Classification Search
CPC ............ B65H 2405/20; B65H 2405/21; B65H 2405/324; B65H 2402/31; B65H 2407/21;
(Continued)

(56) References Cited

U.S. PATENT DOCUMENTS 7,520,502 B2   4/2009  Maeda
7,668,501 B2   2/2010  Murakami et al.
(Continued)

FOREIGN PATENT DOCUMENTS

CN   202498837 U   10/2012
JP   2000-39827 A   2/2000
(Continued)

OTHER PUBLICATIONS

Office Action issued in related Chinese patent application No. 201410122796.8, dated Nov. 18, 2015.
(Continued)

*Primary Examiner* — Jeremy R Severson
(74) *Attorney, Agent, or Firm* — Merchant & Gould P.C.

(57) ABSTRACT

A sheet transport apparatus includes a first casing in which a transport path is formed; a transport unit which transports a sheet along the transport path; a second casing which is provided to be movable with respect to the first casing; a sheet support unit which is rotatably provided in the first casing at a position on a side to which the second casing is moved, the sheet support unit being changeable between a first state, a second state, and a third state and supporting the sheet at least in the third state; and an urging unit which urges the sheet support unit toward the first state within a range from the first state to the second state and which urges the sheet support unit toward the third state within a range from the second state to the third state.

4 Claims, 20 Drawing Sheets

Related U.S. Application Data continuation of application No. 14/226,300, filed on Mar. 26, 2014, now Pat. No. 9,604,801.

(51) Int. Cl.

| | | |
|---|---|---|
| *G03G 15/00* | (2006.01) | |
| *B41J 29/13* | (2006.01) | |
| *H04N 1/00* | (2006.01) | |
| *H04N 1/10* | (2006.01) | |
| *B65H 5/26* | (2006.01) | |
| *B65H 3/44* | (2006.01) | |
| *B65H 3/06* | (2006.01) | |

(52) U.S. Cl.
CPC ............ *B65H 3/0684* (2013.01); *B65H 3/44* (2013.01); *B65H 5/26* (2013.01); *G03G 15/6514* (2013.01); *H04N 1/00551* (2013.01); *H04N 1/00588* (2013.01); *H04N 1/10* (2013.01); *B65H 2402/31* (2013.01); *B65H 2402/441* (2013.01); *B65H 2402/45* (2013.01); *B65H 2402/46* (2013.01); *B65H 2404/611* (2013.01); *B65H 2405/21* (2013.01); *B65H 2405/211* (2013.01); *B65H 2405/212* (2013.01); *B65H 2405/324* (2013.01); *B65H 2405/332* (2013.01); *B65H 2407/21* (2013.01); *B65H 2801/39* (2013.01); *G03G 2215/00392* (2013.01); *H04N 2201/0081* (2013.01); *H04N 2201/0094* (2013.01)

(58) Field of Classification Search
CPC ..... G03G 15/6514; G03G 2215/00392; G03G 2221/1687; H04N 1/00535; H04N 1/00551; H04N 1/00554
USPC ....................................................... 271/9.09
See application file for complete search history.

(56) References Cited

U.S. PATENT DOCUMENTS

| | | | |
|---|---|---|---|
| 7,905,482 | B2 | 3/2011 | Matsumoto |
| 7,926,804 | B2 | 4/2011 | Chinzei et al. |
| 8,172,222 | B2 | 5/2012 | Yoda et al. |
| 8,490,966 | B2 * | 7/2013 | Iwama ................ B41J 3/36 271/145 |
| 8,590,890 | B2 | 11/2013 | Haruyama |
| 8,733,757 | B2 | 5/2014 | Oshiro et al. |
| 9,300,826 | B2 | 3/2016 | Takahata et al. |
| 9,604,801 | B2 * | 3/2017 | Uchino ................ B65H 1/02 |
| 2005/0052520 | A1 | 3/2005 | Yamazaki |
| 2006/0268089 | A1 | 11/2006 | Takeuchi |
| 2008/0237966 | A1 | 10/2008 | Rumford et al. |
| 2009/0022539 | A1 | 1/2009 | Iwama et al. |
| 2009/0200731 | A1 * | 8/2009 | Hirabayashi ........... B41J 13/106 271/207 |
| 2014/0292971 | A1 | 10/2014 | Uchino et al. |
| 2015/0061214 | A1 | 3/2015 | Woo |
| 2015/0181062 | A1 | 6/2015 | Takahata et al. |

FOREIGN PATENT DOCUMENTS

| | | |
|---|---|---|
| JP | 2004-224463 A | 8/2004 |
| JP | 2005-081639 A | 3/2005 |
| JP | 2007-088682 A | 4/2007 |
| JP | 2007-187815 A | 7/2007 |
| JP | 2012-001329 A | 1/2012 |

OTHER PUBLICATIONS

Notification of Reasons for Refusal issued in related Japanese Patent Application No. 2013-253439, dated Jan. 24, 2017.

* cited by examiner

SHEET TRANSPORT APPARATUS AND IMAGE RECORDING APPARATUS

CROSS REFERENCE TO RELATED APPLICATION

The present application is a continuation application of U.S. patent application Ser. No. 15/469,211 filed Mar. 24, 2017, which is a continuation Application of U.S. patent application Ser. No. 14/226,300 filed Mar. 26, 2014, which claims priority from Japanese Patent Application No. 2013-073332 filed on Mar. 29, 2013 and Japanese Patent Application No. 2013-253439 filed on Dec. 6, 2013 the disclosures of all of which are incorporated herein by reference in their entirety.

BACKGROUND OF THE INVENTION

Field of the Invention

The present invention relates to a sheet transport apparatus for transporting a sheet along a transport path and an image recording apparatus provided with the sheet transport apparatus.

Description of the Related Art

An image recording apparatus is known, wherein a transport path is formed at the inside of an apparatus casing, and an image is recorded on a sheet which is guided to and transported through the transport path. Such an image recording apparatus has, in some cases, a paper feed cassette for supporting a plurality of sheets. Further, an image recording apparatus is known, which has a manual feed tray for guiding a sheet to a transport path distinctly from a paper feed cassette.

In the case of the image recording apparatus as described above, in order to perform the maintenance and/or dissolve the paper jamming, a construction may be adopted such that a part of the casing of the image recording apparatus is opened/closed. On the other hand, in the case of a form in which the image recording apparatus is realized as a multifunction machine having a scanner function, a construction may be adopted such that a manuscript cover of a flatbed scanner is opened/closed.

SUMMARY OF THE INVENTION

In the case of the image recording apparatus having the construction as described above, if a manual feed tray is arranged while avoiding the rotation ranges of a casing and a manuscript cover in order that, for example, the casing and the manuscript cover, which are to be opened/closed, do not collide with the manual feed tray, a problem arises such that the image recording apparatus is large-sized.

The present invention has been made taking the foregoing problem into consideration, an object of which is to provide a small-sized apparatus having a casing and a sheet support unit to be subjected to the state change.

According to a first aspect of the present invention, there is provided a sheet transport apparatus including: a first casing in which a transport path for transporting a sheet is formed; a transport unit configured to transport the sheet along the transport path; a second casing which is provided to be movable with respect to the first casing; a sheet support unit which is rotatably provided in the first casing at a position on a side to which the second casing is moved, the sheet support unit being configured to be changeable between a first state, a second state, and a third state in such an order that a rotation forward end of the sheet support unit is disposed nearer to the second casing, and being configured to support the sheet to be fed to the transport path at least in the third state; and an urging unit configured to urge the sheet support unit toward the first state within a range ranging from the first state to the second state and to urge the sheet support unit toward the third state within a range ranging from the second state to the third state, wherein the sheet support unit in the first state is configured to follow the second casing between the first state and the second state in accordance with abutment of the second casing which is moved with respect to the first casing.

When the second casing is moved with respect to the first casing, the sheet support unit is rotated between the first state and the second state in accordance with the abutment of the second casing against the sheet support unit. In this situation, the urging unit urges the sheet support unit to provide the first state. Therefore, the sheet support unit follows the state change of the second casing. If a user moves the second casing in the abutment state and the sheet support unit is rotated from the first state to the third state beyond the second state, then the sheet support unit is retained in the third state, because the urging unit urges the sheet support unit so that the third state is provided. Accordingly, the sheet support unit can be arranged in the moving range of the second casing.

According to a second aspect of the present invention, there is provided a sheet transport apparatus including: a first casing in which a transport path for transporting a sheet is formed; a transport unit configured to transport the sheet along the transport path; a second casing which is provided rotatably with respect to the first casing and which is configured to be changeable between an abutment state in which a rotation forward end side of the second casing abuts against the first casing and a separation state in which the rotation forward end side of the second casing is separated from the first casing; a sheet support unit which is provided on a rotation base end side of the second casing in the first casing and which is configured to rotate about a rotation axis parallel to a rotation axis of the second casing, the sheet support unit being configured to be changeable between a first state, a second state, and a third state in such an order that a rotation forward end of the sheet support unit is disposed nearer to the second casing, and being configured to support the sheet to be fed to the transport path at least in the third state; and an urging unit configured to urge the sheet support unit toward the first state within a range ranging from the first state to the second state and to urge the sheet support unit toward the third state within a range ranging from the second state to the third state, wherein the sheet support unit in the first state is configured to follow the second casing between the first state and the second state in accordance with abutment of the second casing which is changed between the abutment state and the separation state.

When the second casing is changed between the abutment state and the separation state, the sheet support unit is rotated between the first state and the second state in accordance with the abutment of the second casing. In this situation, the urging unit urges the sheet support unit to provide the first state. Therefore, the sheet support unit follows the state change of the second casing. If the sheet support unit is rotated by a user from the first state to the third state beyond the second state when the second casing is in the abutment state, then the sheet support unit is retained in the third state, because the urging unit urges the sheet support unit so that the third state is provided. Accordingly, the sheet support unit can be arranged in the rotation range of the second casing.

According to the present invention, the small-sized apparatus is realized, which has the casing subjected to the state change and the sheet support unit.

DESCRIPTION OF THE PREFERRED EMBODIMENTS

Figure 1:
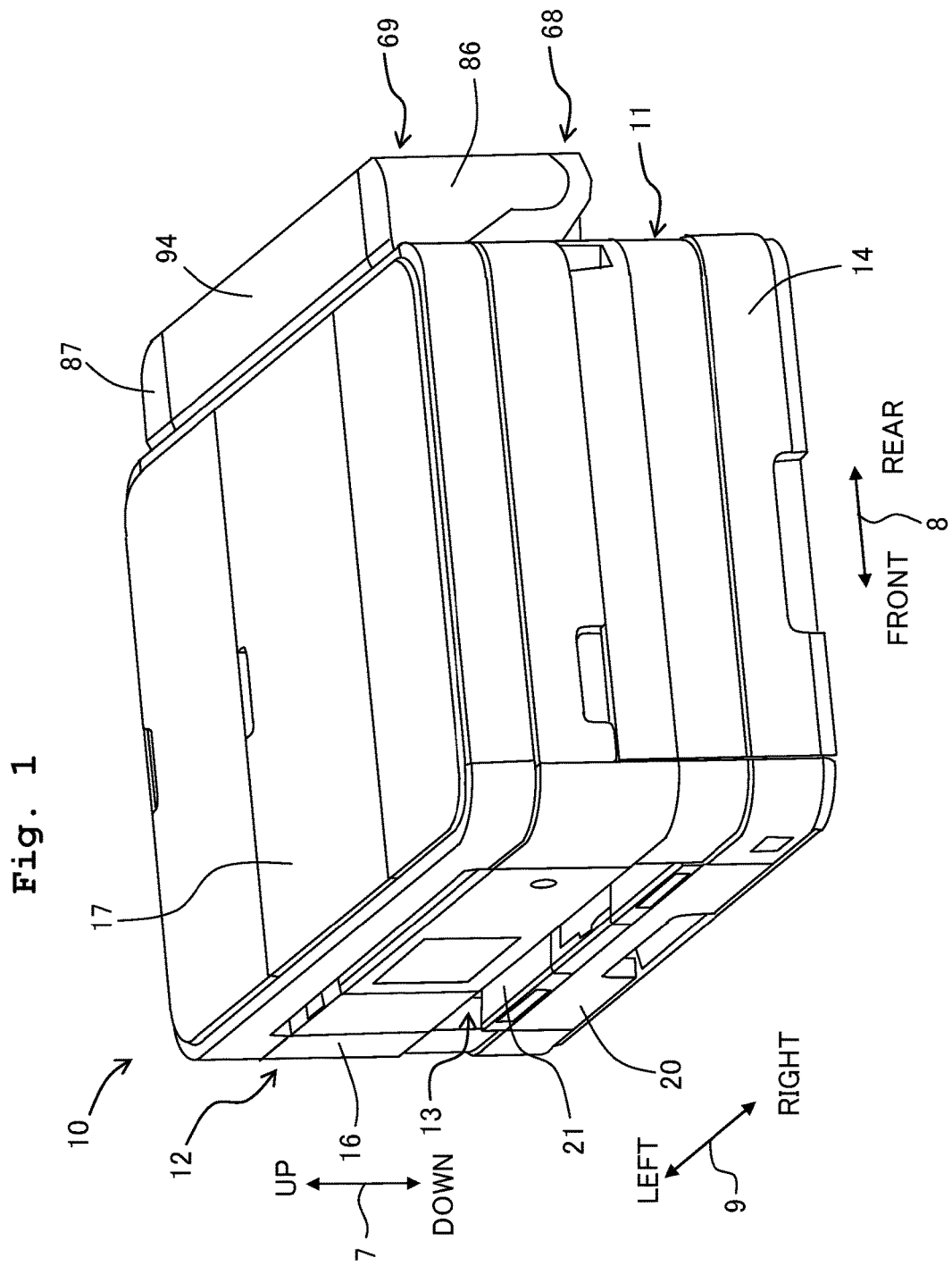
FIG. 1 shows a perspective view illustrating a multifunction machine in which a movable unit is in an upstanding state.

A multifunction machine 10 according to an embodiment of the present invention will be explained below. The embodiment explained below is merely an example of the present invention. It goes without saying that the embodiment can be appropriately changed within a range without changing the gist or essential characteristics of the present invention. Further, in the following explanation, the up-down direction 7 (vertical direction) is defined based on the state (state shown in FIG. 1) in which the multifunction machine 10 (example of the image recording apparatus of the present invention) is installed usably, the front-rear direction 8 is defined assuming that the side on which the opening 13 is provided is the front side (front surface), and the left-right direction 9 is defined while viewing the multifunction machine 10 from the front side (front surface).

<Overall Arrangement of Multifunction Machine 10>

As shown in FIG. 1, the multifunction machine 10 is formed to have a substantially rectangular parallelepiped shape. The multifunction machine 10 is provided with a printer unit 11 for recording an image on a sheet of the recording paper or the like in accordance with the ink-jet recording system. The multifunction machine 10 has various functions including, for example, the facsimile function and the print function. The printer unit 11 corresponds to the image recording apparatus.

The printer unit 11 has a casing 14 which is formed with an opening 13 disposed on the front surface. Further, a feed tray 20 and a discharge tray 21, on which the recording paper sheets of various sizes can be placed, can be inserted/removed in the front-rear direction 8 with respect to the opening 13.

Figure 5:
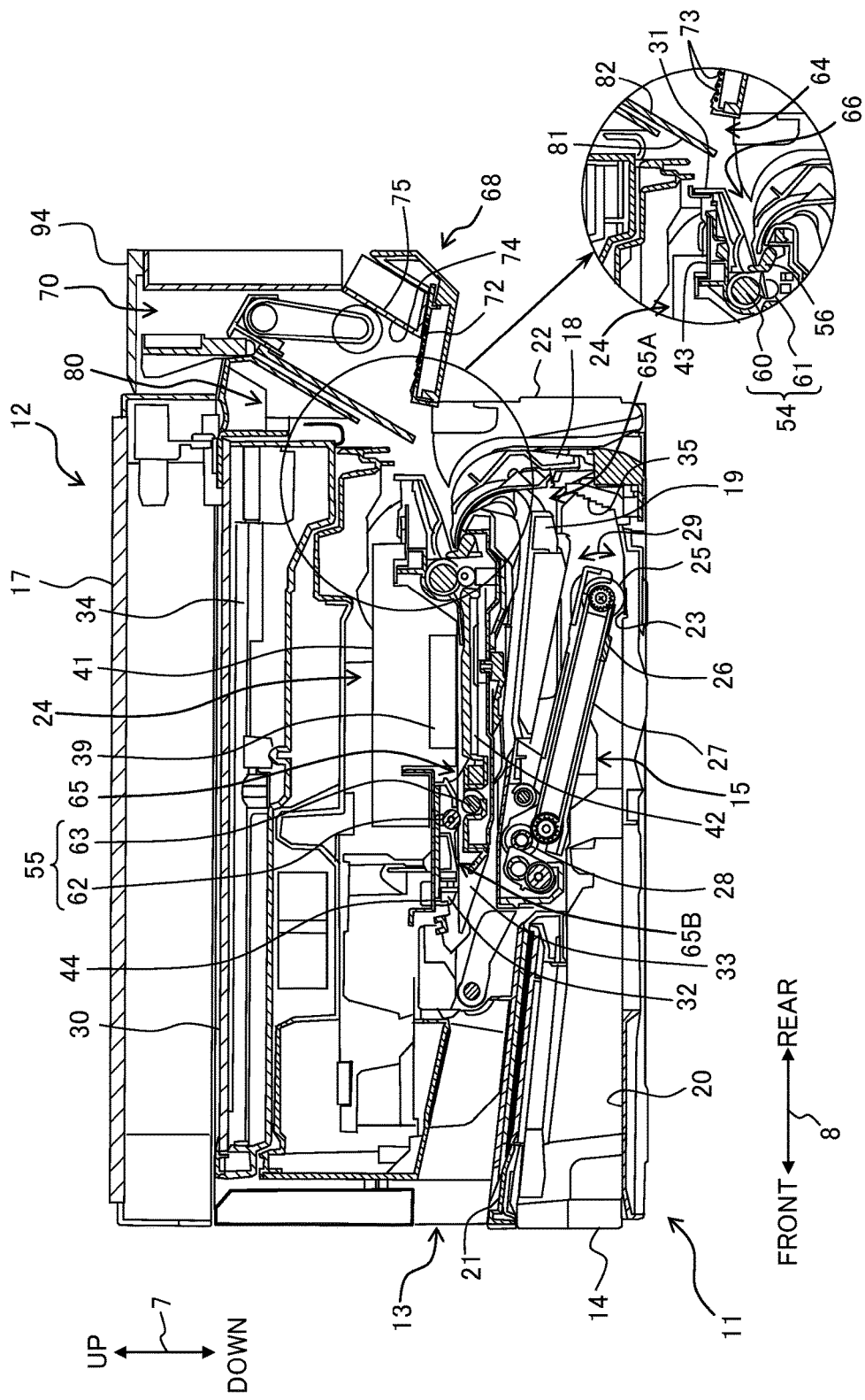
FIG. 5 shows a longitudinal sectional view illustrating the internal structure of a printer unit.

As shown in FIG. 5, the printer unit 11 is provided with, for example, a feed unit 15 for feeding the recording paper from the feed tray 20, a recording unit 24 for recording an image on the recording paper, a first transport roller pair 54, and a second transport roller pair 55. The sheet transport apparatus is constructed by the transport unit 15 except for the recording unit 24, the first transport roller pair 54, the second transport roller pair 55, a feed tray 20, a bypass tray 70, a manual feed tray 80, and a scanner unit 12.

As shown in FIG. 1, the scanner unit 12 is provided over or above the printer unit 11. The sizes of a casing 16 of the scanner unit 12 in the front-rear direction 8 and the left-right direction 9 are the same as those of the casing 14 of the printer unit 11. Therefore, the substantially rectangular parallelepiped-shaped contour (outer shape) of the multifunction machine 10 is formed by integrating the casing 14 of the printer unit 11 and the casing 16 of the scanner unit 12 into one unit while the scanner unit 12 is disposed at the upper position. The casing 14 and the casing 16 correspond to the first casing.

The scanner unit 12 is a flatbed scanner. An image sensor 34, which is capable of optically reading an image of a manuscript, is provided at the inside of the casing 16. A platen glass 30, on which the manuscript is to be placed, is provided at the upper surface of the casing 16. The platen glass 30 is covered with a manuscript cover 17. FIGS. 1 and 5 show the state in which the platen glass 30 is covered with the manuscript cover 17.

The manuscript cover 17 is connected to the back surface side of the casing 16, and the manuscript cover 17 is rotatable about the rotational shaft provided in the left-right direction 9. As shown in FIG. 1, the manuscript cover 17 abuts against the upper surface of the casing 16, and thus the manuscript cover 17 is maintained in the state in which the platen glass 30 is covered (abutment state). The front surface side of the manuscript cover 17 is lifted upwardly as starting from the state shown in FIG. 1, and thus the manuscript cover 17 is rotated and the platen glass 30 is exposed (separation state). The manuscript cover 17 may be provided with an automatic document feeder (ADF) for picking up, one by one, and transporting a plurality of sheets of the manuscript or document for which the image reading is performed. The manuscript cover 17 corresponds to the second casing.

<Printer Unit 11>

The structure of the printer unit 11 will be explained in detail below.

<Feed Tray 20>

The feed tray 20 has such an outer shape that the lengths in the front-rear direction 8 and the left-right direction 9 are longer than the length in the up-down direction 7, and the feed tray 20 has a box-shaped form in which the upper portion is open or released. The discharge tray 21 is placed on the front side of the feed tray 20. For example, the recording paper sheets having various large and small sizes including, for example, the A4 size based on the Japanese Industrial Standards and the L size used for the photograph recording can be placed on the feed tray 20. The feed tray 20 is accommodated in the internal space communicated with the opening 13 of the casing 13. The feed tray 20 is moveable back and forth in the front-rear direction 8 with respect to the casing 14 via the opening 13.

<Feed Unit 15>

As shown in FIG. 5, the feed unit 15 is provided with a feed roller 25, a feed arm 26, a driving transmission mechanism 27, and a separation pad 23. The feed unit 15 is provided above the feed tray 20 and below the recording unit 24. The feed roller 25 is rotatably supported by the forward end portion of the feed arm 26. The feed arm 26 is rotatable in the direction of the arrow 29 about the center of a shaft 28 provided at the proximal end portion. Accordingly, the feed roller 25 can abut against the bottom surface of the feed tray 20, and the feed roller 25 can be separated therefrom. The feed roller 25 can abut against the recording paper placed on the feed tray 20. The separation pad 23 is provided at the position opposed to the feed roller 25 on the bottom surface of the feed tray 20. The separation pad 23 is a member which has the frictional coefficient larger than that of the bottom surface of the feed tray 20.

The driving force of a motor (not shown) is transmitted to the feed roller 25 by the aid of the driving transmission mechanism 27. The driving transmission mechanism 27 transmits the rotation transmitted to the shaft 28 to the shaft of the feed roller 25 by means of an endless belt. The feed roller 25 is rotated in such a state that the feed roller 25 is allowed to abut against the recording paper sheet disposed on the uppermost side of the recording paper sheets stacked on the bottom surface of the feed tray 20, and thus the recording paper sheet is fed to the transport path 65. When the recording paper is fed to the transport path 65, the forward end of the recording paper abuts against a separation member 35 which is provided on the back side in the front-rear direction 8 of the feed tray 20. Accordingly, the recording paper sheets, which are disposed on the lower side, are retained on the feed tray 20 without being dragged by the recording paper sheet which is disposed on the uppermost side. The recording paper sheet, which is disposed on the lowermost side, is not dragged owing to the frictional force generated with respect to the separation pad 23, when the recording paper sheet, which is disposed just thereover, is fed.

<Transport Path 65>

As shown in FIG. 5, the transport path 65, which is provided in the internal space of the casing 14, extends while being curved to make U-turn upwardly from the back side of the feed tray 20. Further, the transport path 65 is bent toward the front side from the back side of the printer unit 11 to extend substantially straight, and the transport path 65 arrives at the discharge tray 21. The transport path 65 is roughly classified into a curved passage 65a which makes U-turn and a straight passage 65B which is straight.

The curved passage 65A is formed by an outer guide member 18, an inner guide member 19, and a guide member 31 which are opposed to one another while being separated by the space through which the sheet can pass. The straight passage 65B is formed by a recording unit 24 and a platen 42 which are opposed to one another while being separated by the space through which the sheet can pass, a guide member 32 and a guide member 33.

The recording paper, which is fed to the transport path 65 by the feed roller 25 of the feed tray 20, is guided from the downward to the upward along the curved passage 65A, and thus the transport direction is inverted. After that, the recording paper is transported from the backward to the frontward along the straight passage 65B without inverting the transport direction.

The outer guide member 18 is a member which constitutes the outer guide surface of the curved passage 65A. The inner guide member 19 is a member which constitutes the inner guide surface of the curved passage 65A. Each of the guide surfaces may be constructed by one surface, or each of the guide surfaces may be constructed by forward ends of a plurality of ribs.

The guide member 31 is arranged above the inner guide member 19 on the upstream side in the transport direction (on the back side) with respect to the first transport roller pair 54. The outer guide member 18 and the guide member 31 are also members for defining a bypass route 66 described later on.

<Back Surface Cover 22>

Figure 8:
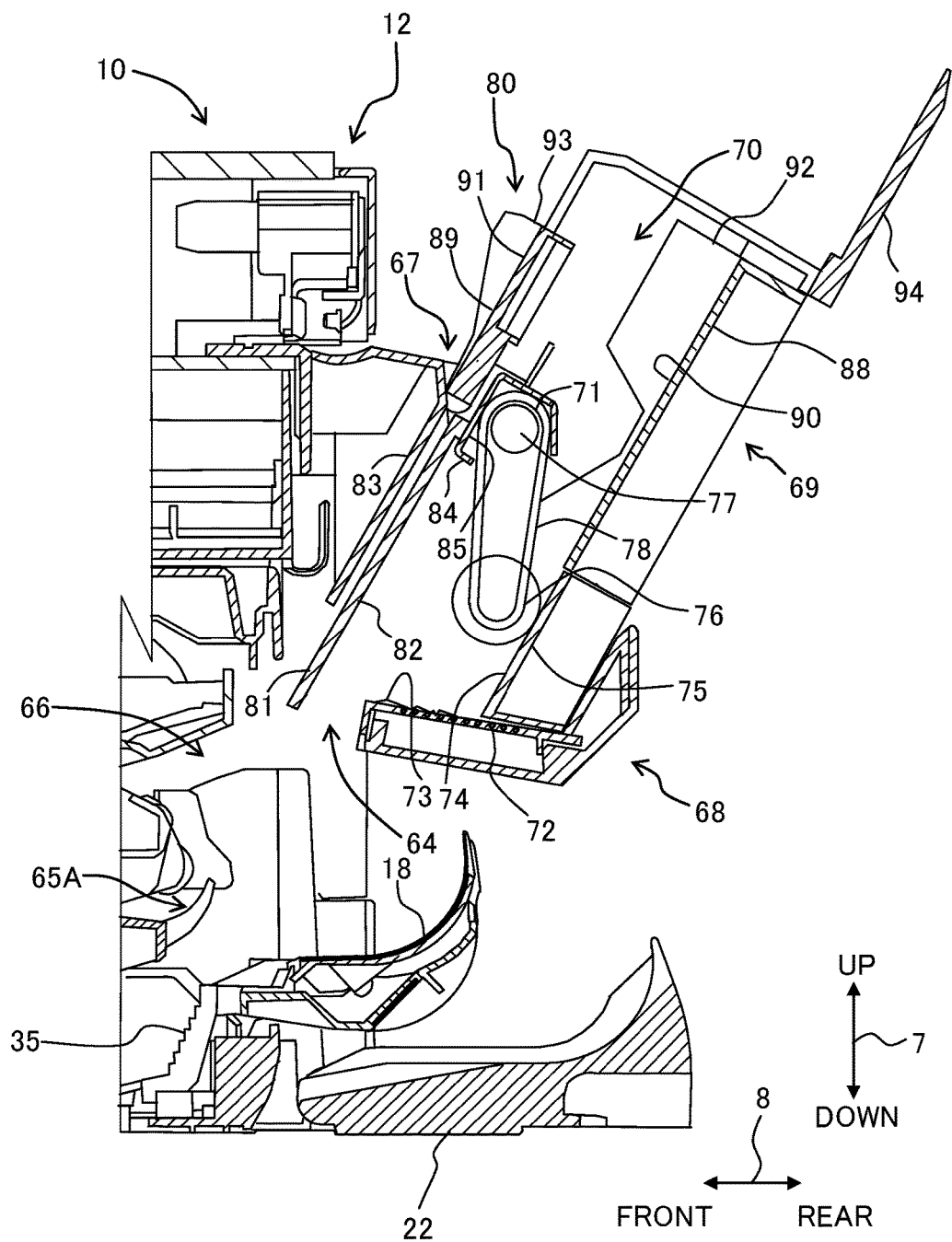
FIG. 8 shows an enlarged longitudinal sectional view illustrating the internal structure of the bypass tray and the manual feed tray in which the movable unit is in the inclined state and a back surface cover and an outer guide member are in the open state.

A back surface cover 22 is a member which supports the outer guide member 18 to constitute a part of the back surface of the casing 14. The back surface cover 22 is rotatably supported by the casing 14 at both left and right ends on the lower side. As shown in FIG. 8, as for the back surface cover 22, the upper side is fallen backwardly about the rotational shaft provided in the left-right direction 9 on the lower side, and thus the back surface cover 22 makes it possible to open or release the transport path 65 and the bypass route 66 described later on.

The outer guide member 18 is also rotatably supported by the casing 14 at both left and right ends on the lower side in the same manner as the back surface cover 22. As for the outer guide member 18, in a state in which the back surface cover 22 is open, the upper side is fallen backwardly about the rotational shaft provided in the left-right direction 9 on the lower side, and thus the curved passage 65A can be also opened or released. As shown in FIG. 5, when the back surface cover 22 is allowed to upstand and the back surface cover 22 is closed, then the outer guide member 18 is supported by the back surface cover 22 from the backward, the outer guide member 18 is maintained in the upstanding state, and the outer guide member 18 is opposed to the inner guide member 19 to define the curved passage 65A.

<First Transport Roller Pair 54 and Second Transport Roller Pair 55>

As shown in FIG. 5, the first transport roller pair 54 is provided on the upstream side in the transport direction (frontward orientation in the front-rear direction 8) from the recording unit 24 in the transport path 65. The first transport roller pair 54 has a first transport roller 60 and a pinch roller 61. The second transport roller pair 55 is provided on the downstream side in the transport direction from the recording unit 24 in the transport path 65. The second transport roller pair 55 has a second transport roller 62 and a spur 63. The first transport roller 60 and the second transport roller 62 are rotated by transmitting the rotation of a motor (not shown). The first transport roller pair 54 and the second transport roller pair 55 transport the recording paper by rotating the first transport roller 60 and the second transport roller 62 in the state in which the recording paper is interposed between the respective rollers for constructing the first transport roller pair 54 and the second transport roller pair 55. The first transport roller pair 54 and the second transport roller pair 55 correspond to the transport unit.

<Recording Unit 24>

As shown in FIG. 5, the recording unit 24 is provided on the upper side of the straight passage 65B while being opposed to the platen 42 between the first transport roller pair 54 and the second transport roller pair 55. The recording unit 24 is provided with a carriage 41 and a recording head 39. The carriage 41 is supported by guide rails 43, 44 provided on the back side and the front side of the platen 42. A known belt mechanism is provided for the guide rail 44. The carriage 41 is connected to an endless belt of the belt mechanism. The carriage 41 is movable in the left-right direction 9 along the guide rails 43, 44 in accordance with the rotation of the endless belt.

The recording head 39 is carried on the carriage 41. A plurality of nozzles (not shown) is formed on the lower surface of the recording head 39. Inks are supplied from ink cartridges (not shown) to the recording head 39. The recording head 39 selectively discharges the inks as minute ink droplets from the plurality of nozzles. When the carriage 41 is moved in the left-right direction 9, the ink droplets are discharged from the nozzles to the recording paper supported by the platen 42. The discharged ink droplets adhere to the recording paper on the platen 42, and thus an image is recorded on the recording paper.

<Bypass Route 66>

An opening 64 is provided above the back surface cover 22 on the back surface of the casing 14. The bypass route 66, which extends from the opening 64 to the first transport roller pair 54, is formed at the inside of the casing 14. The bypass route 66 is the route which extends obliquely downwardly from the backward to the frontward in the front-rear direction 8. An upper guide surface of the bypass route 66 is formed by the guide member 31, and a lower guide surface is formed by the outer guide member 18 and the back surface cover 22. Both of the curved passage 65A and the straight passage 65B of the transport path 65 are arranged under or below the bypass route 66. As for the outer guide member 18 and the back surface cover 22, the upper side is rotated so that the upper side is fallen backwardly, and thus the bypass route 66 is opened or released together with the transport path 65.

The recording paper sheets, which are placed on a bypass tray 70 and a manual feed tray 80 described later on, are guided obliquely downwardly via the bypass route 66, and each of the recording paper sheets enters the straight passage 65B of the transport path 65. The image recording is performed by the recording unit 24 while transporting the recording paper by the first transport roller pair 54, and the recording paper is discharged to the discharge tray 21. In this way, the recording paper sheets, which are placed on the bypass tray 70 and the manual feed tray 80, are transported via the route having the substantially straight shape.

<Bypass Tray 70 and Manual Feed Tray 80>

The bypass tray 70 and the manual feed tray 80 are provided on the back surface side of the multifunction machine 10. The bypass tray 70 and the manual feed tray 80 support the recording paper independently from the feed tray 20. The bypass tray 70 is arranged in an aligned manner in the up-down direction 7 on the back surface side of the multifunction machine 10 while allowing the manual feed tray 80 to be disposed thereover or thereabove. The bypass tray 70 corresponds to the sheet support unit. The manual feed tray 80 corresponds to the auxiliary sheet support unit.

Figure 6:
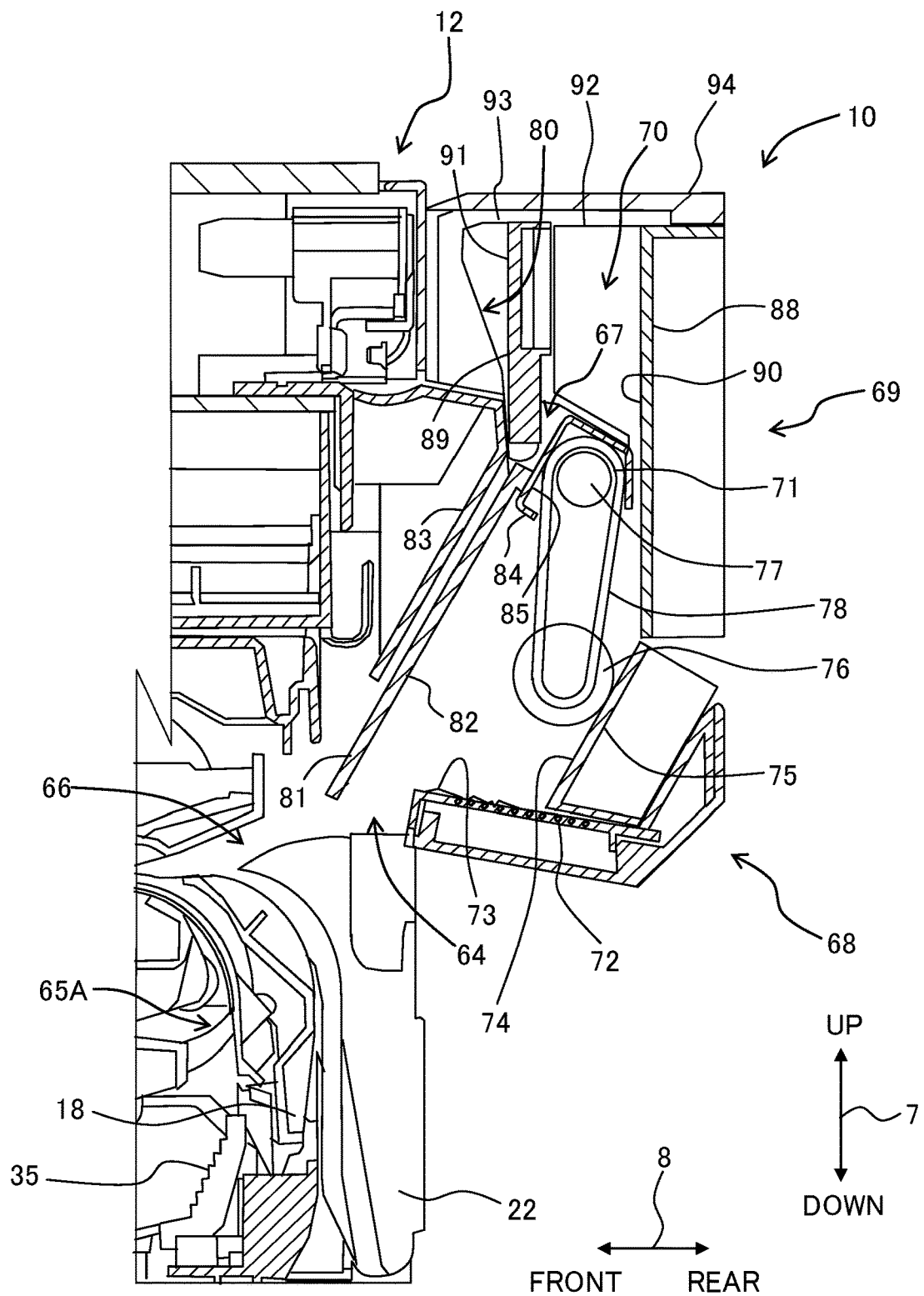
FIG. 6 shows an enlarged longitudinal sectional view illustrating the internal structure of a bypass tray and a manual feed tray in which the movable unit is in the upstanding state.

As shown in FIGS. 1 and 6, a fixed unit 68, which extends downwardly so that the opening 64 is covered therewith, is formed on the back surface side of the casing 16 of the scanner unit 12. The fixed unit 68 constitutes parts of the bypass tray 70 and the manual feed tray 80 on the downstream side in the transport direction. A movable unit 69 is provided rotatably on the upper side of the fixed unit 68. The bypass tray 70 and the manual feed tray 80 are constructed by the fixed unit 68 and the movable unit 69.

Figure 4:
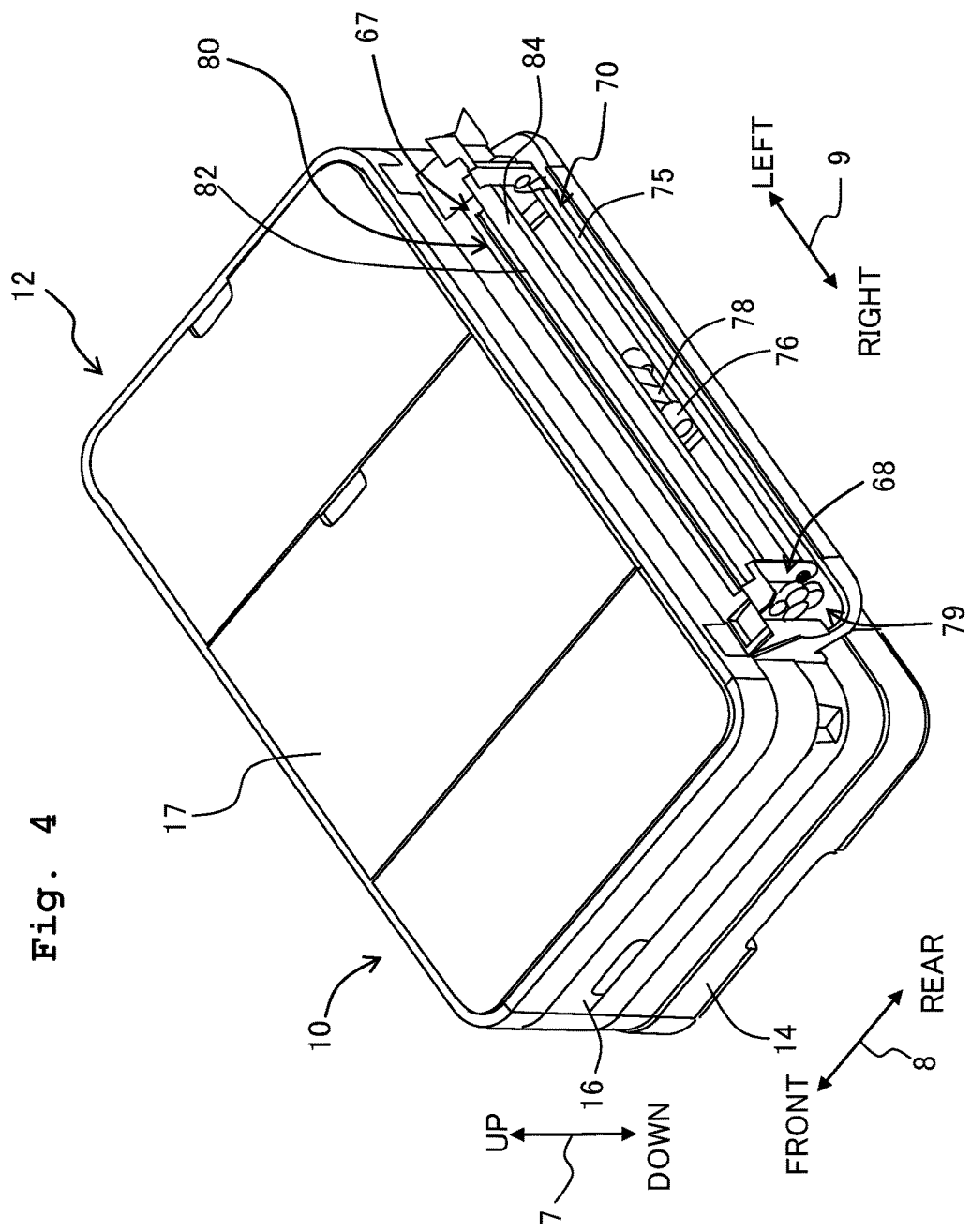
FIG. 4 shows a perspective view illustrating the multifunction machine on a back surface side in a state in which the movable unit is removed.
Figure 9:
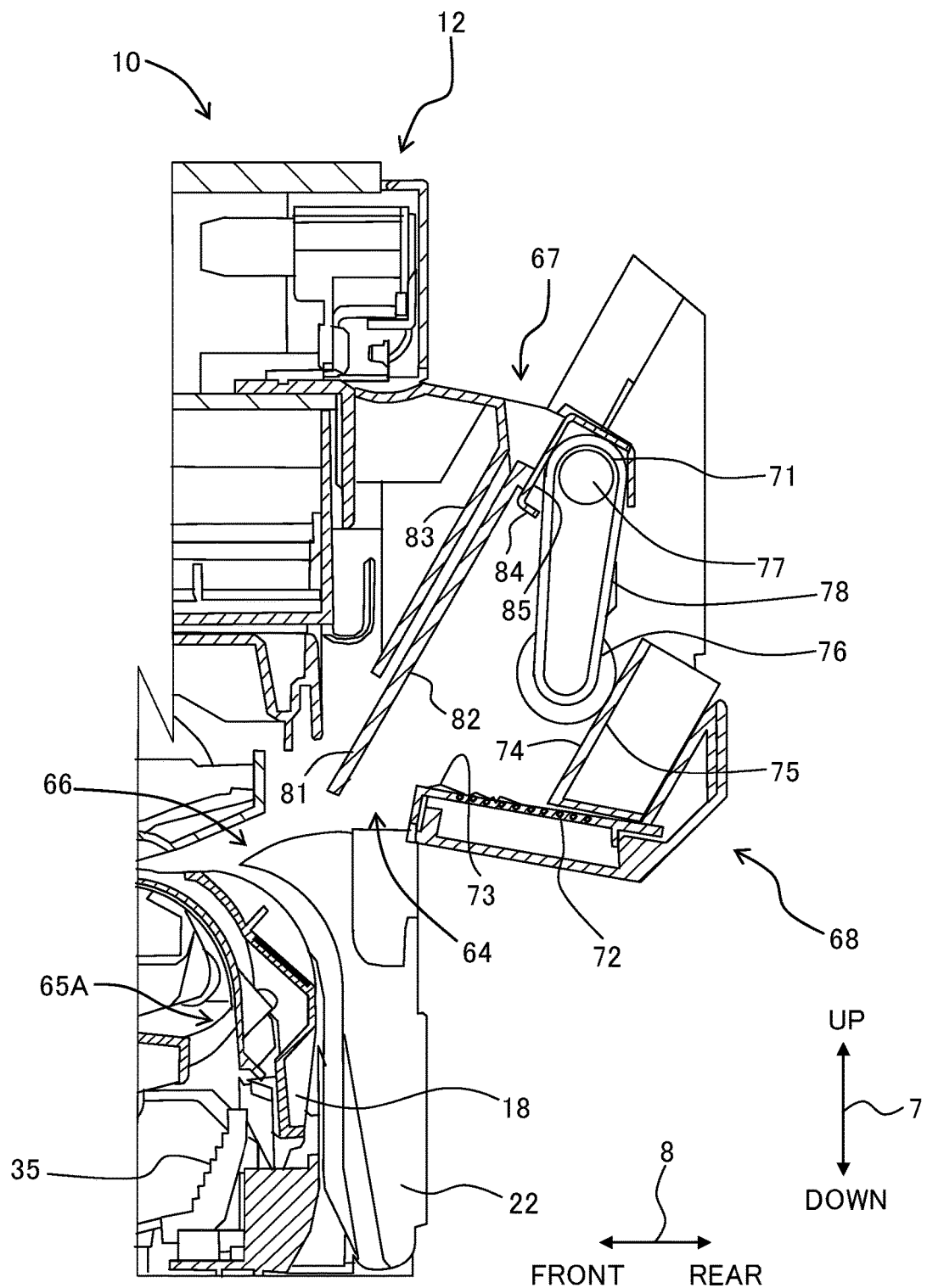
FIG. 9 shows an enlarged longitudinal sectional view illustrating the internal structure of the bypass tray and the manual feed tray in a state in which the movable unit is removed.

As shown in FIGS. 4 and 9, a slit-shaped opening 67, which extends in the left-right direction 9, is formed on the upper surface of the fixed unit 68. A passage is formed from the opening 67 toward the bypass route 66. A support member 82, which forms a support surface 81 of the manual feed tray 80, is provided on the lower side of the passage. The support surface 81 is inclined so that the lower end is directed more frontward with respect to the placement surface on which the multifunction machine 10 is placed. A guide member 83, which is opposed to the support surface 81, is provided on the upper side of the passage. The passage, which is defined by the support member 82 and the guide member 83, extends obliquely downwardly from the opening 67, and the passage is connected to the bypass route 66. The lower end of the support member 82 forms a part of the guide surface on the upper side of the bypass route 66. The placement surface, on which the multifunction machine 10 is placed in this embodiment, is the surface which expands in the left-right direction 9 and the front-rear direction 8.

A separation tab 72 is provided under or below the support member 82 in the fixed unit 68. The separation tab 72 is positioned at a height equivalent to that of the lower end circumferential edge of the opening 64 in the up-down direction 7. The separation tab 72 extends obliquely downwardly from the lower end circumferential edge of the opening 64. The upper surface of the separation tab 72 is the surface against which the forward end of the recording paper supported by the bypass tray 70 abuts. A plurality of teeth 73 protrude upwardly from the upper surface while being aligned in the front-rear direction 8 on the upper surface of the separation tab 72. The forward ends of the plurality of recording paper sheets supported by the bypass tray 70 are disentangled or unraveled by the teeth 73.

A support member 75, which is separated backwardly from the opening 64 and which forms a support surface 74 of the bypass tray 70, is provided above the separation tab 72. The support surface 74 is inclined with respect to the placement surface on which the multifunction machine 10 is placed. The support surface 74 is substantially parallel to the support surface 81 of the manual feed tray 80.

A bearing unit 71, which rotatably supports a drive shaft 77 of a feed roller 76, is provided on the opposite side opposite to the support surface 81 on the upper end side of the support member 82. The drive shaft 77, which is supported by the bearing unit 71, is rotated by transmitting the driving force from an unillustrated motor via a driving transmitting unit 79 (see FIGS. 3 and 4).

Figure 3:
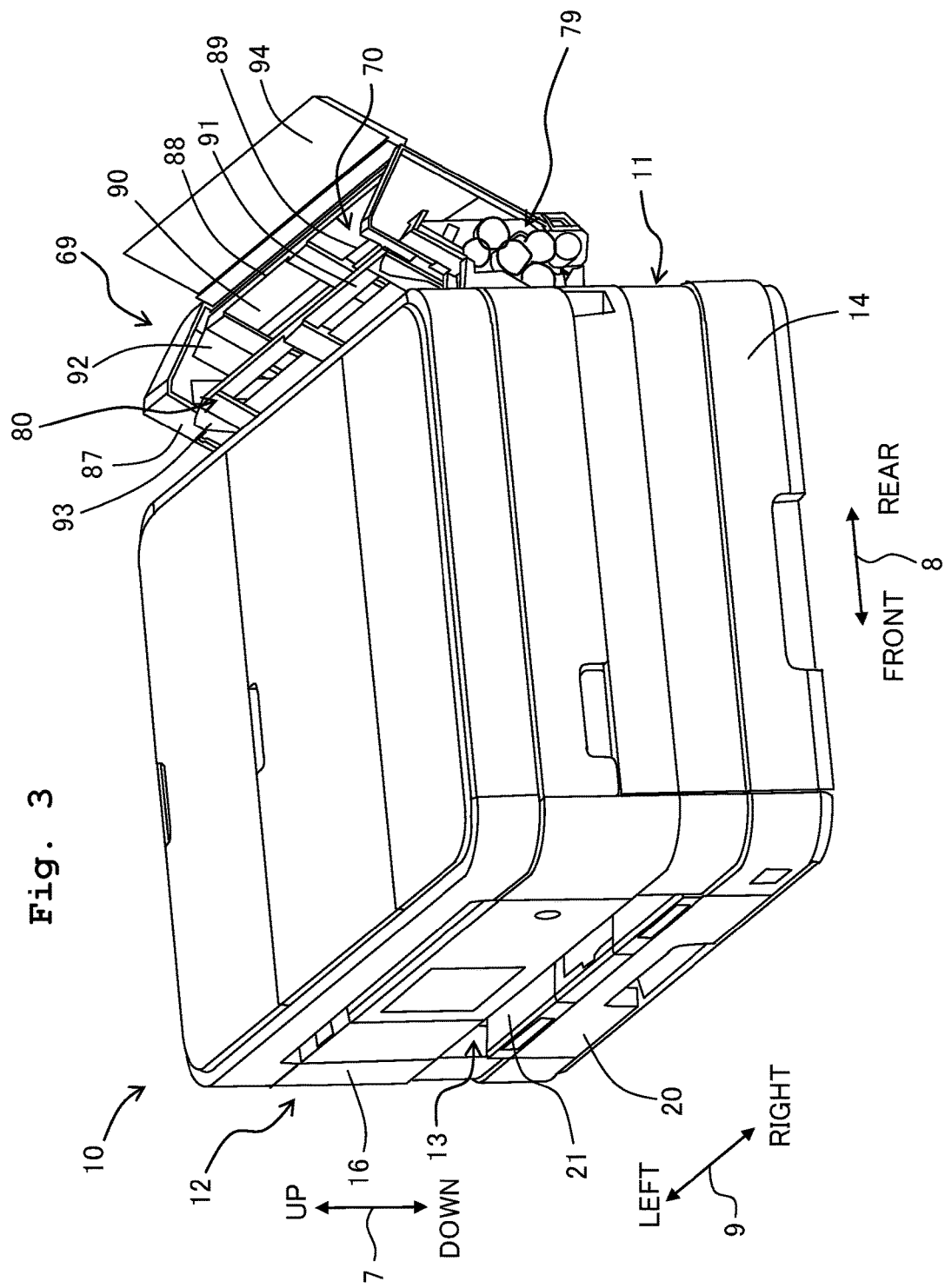
FIG. 3 shows a perspective view illustrating the multifunction machine in a state in which the movable unit is in the upstanding state and a side wall is removed.

As shown in FIGS. 3 and 4, the driving transmitting unit 79, which is composed of a plurality of pinion gears, is provided on the right side in the left-right direction 9 of the fixed unit 68. The driving force is transmitted to the driving transmitting unit 79 from the motor (not shown) provided at the inside of the casing 14 of the printer unit 11. The drive shaft 77 (see FIGS. 6 to 9) extends in the left-right direction 9, and one end thereof is meshed with the pinion gear which constitutes the driving transmitting unit 79. The other end of the drive shaft 77 extends to the center in the left-right direction 9 in the fixed unit 68.

An arm 78, which rotatably supports the feed roller 76, is provided on the other end side of the drive shaft 77. The arm 78 extends downwardly toward the support surface 74 of the support member 75 from the drive shaft 77. The arm 78 is arranged at the center in the left-right direction 9 in the fixed unit 68. The arm 78 is constructed to be rotatable about the drive shaft 77.

The feed roller 76 is provided on forward end side of the rotation of the arm 78. The feed roller 76 is connected to the drive shaft 77 by means of an unillustrated endless belt. The rotation of the drive shaft 77 is transmitted to the feed roller 76 by means of the endless belt, and the feed roller 76 is rotated. When the feed roller 76 is rotated in a state in which the feed roller 76 abuts against the recording paper sheet disposed on the uppermost side of the recording paper sheets supported by the support surface 74 of the bypass tray 70, the concerning recording paper sheet is thereby fed to the bypass route 66. The recording paper sheets, which are disposed on the lower side, are disentangled or unraveled by the teeth 73 of the separation tab 72, and the recording paper sheets are retained in the bypass tray 70 without being dragged by the recording paper sheet disposed on the uppermost side. In this way, the feed unit, which is constructed by the feed roller 76, the drive shaft 77, and the arm 78, is arranged in the space which is defined by the support surfaces 74, 81 at the outside of the casing 14.

A reinforcing member 84 is provided on the opposite side opposite to the support surface 81 on the upper end side of the support member 82. A recess 85, which forms a step or difference in height with respect to the support surface 81, is provided on the upper end side of the support member 82. The reinforcing member 84 is provided in the recess 85. The reinforcing member 84 is the member which is obtained by folding and bending a metal plate, and the reinforcing member 84 is provided in order to reinforce the rigidity of the support member 82. The reinforcing member 84 extends in the left-right direction 9 of the support member 82 along the support surface 81, and the both ends thereof arrive at positions disposed in the vicinity of the both ends of the support member 82. The left-right direction 9, in which the reinforcing member 84 extends, is perpendicular to the transport direction of the recording paper in relation to the manual feed tray 80.

Figure 2:
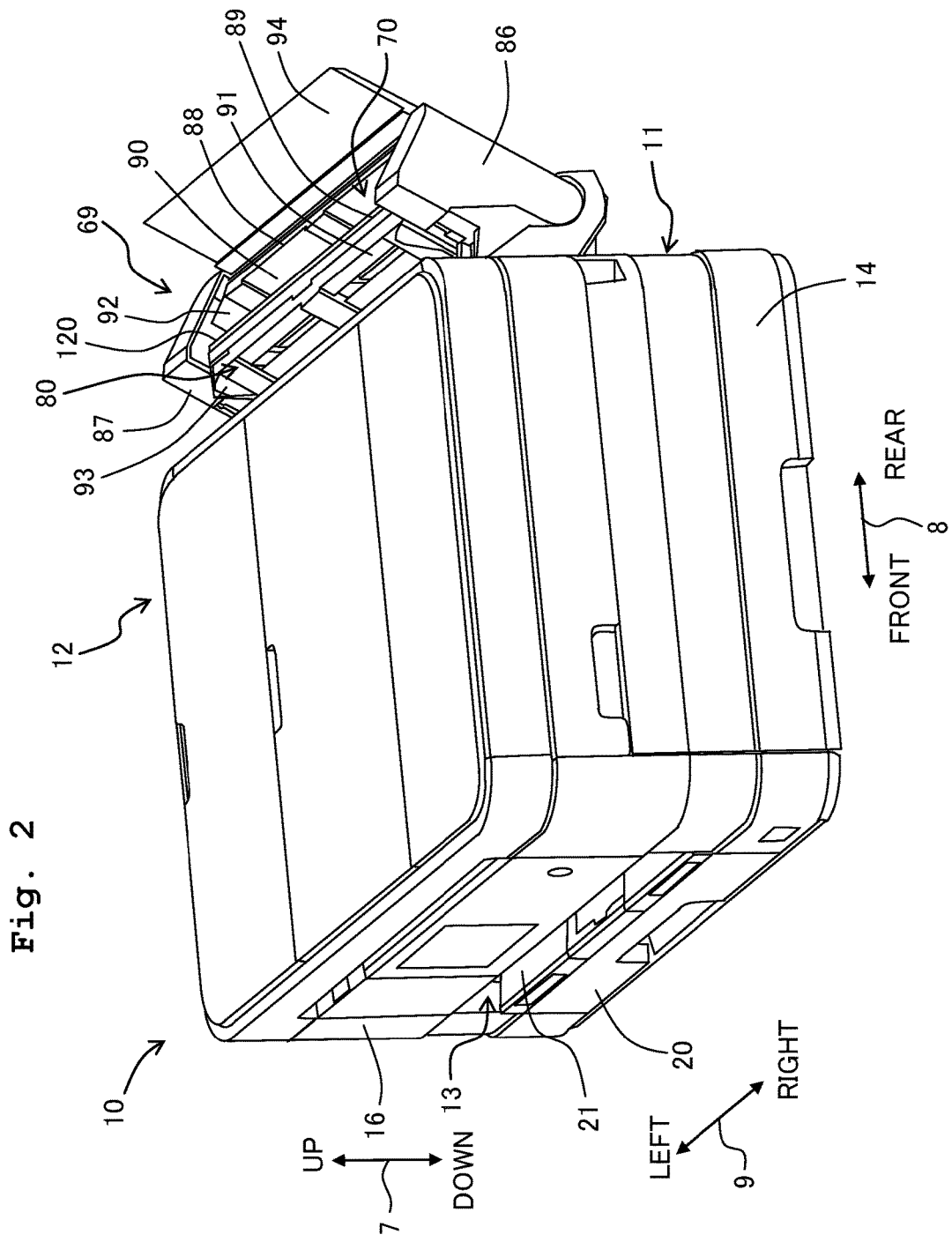
FIG. 2 shows a perspective view illustrating the multifunction machine in which the movable unit is in an inclined state.
Figure 7:
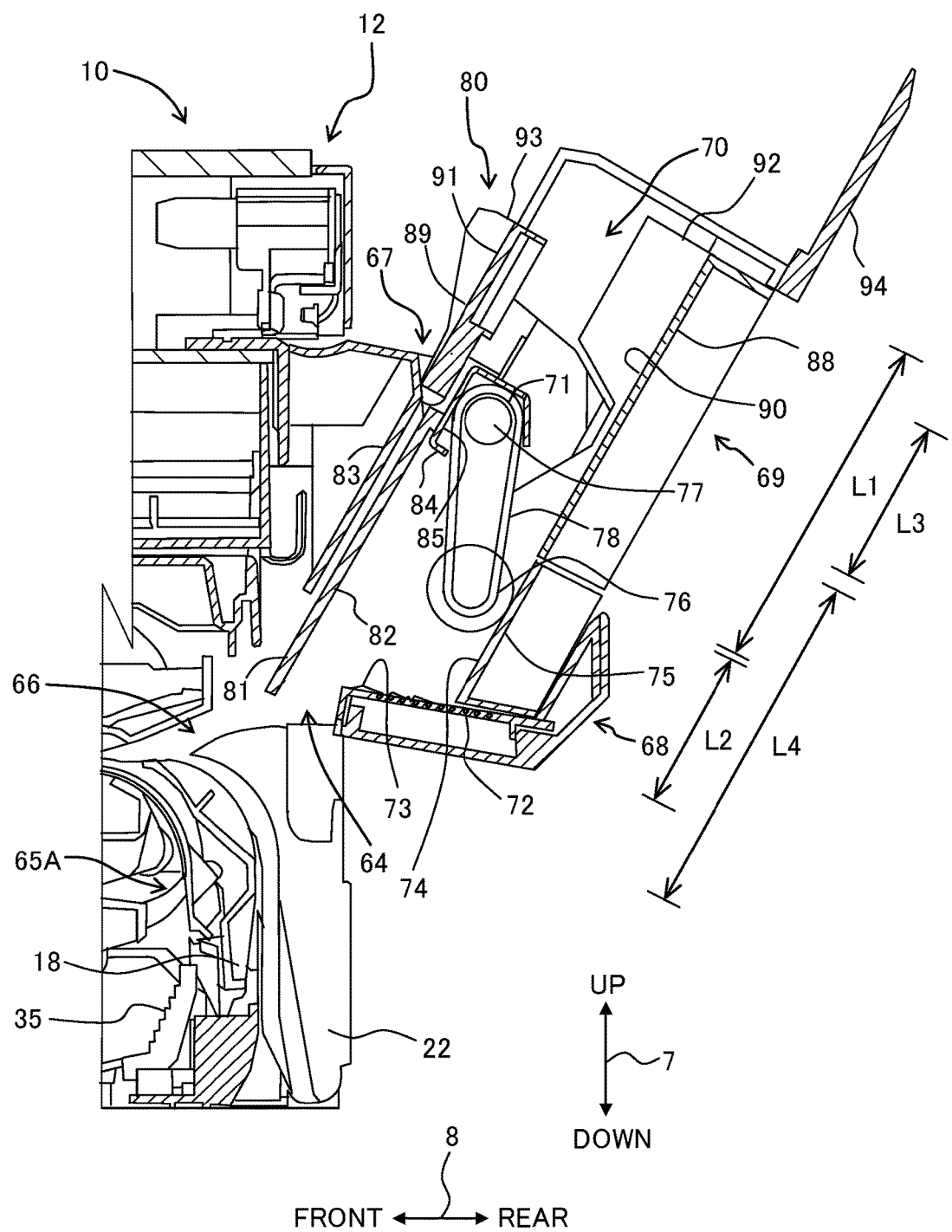
FIG. 7 shows an enlarged longitudinal sectional view illustrating the internal structure of the bypass tray and the manual feed tray in which the movable unit is in the inclined state.

As shown in FIGS. 2 and 7, the movable unit 69 is rotatably connected on the lower side of the fixed unit 68. The movable unit 69 is rotatable between the upstanding state (first state) in which the movable unit 69 upstands in the up-down direction 7 as shown in FIGS. 1 and 6 and the inclined state (third state) in which the movable unit 69 is inclined with respect to the up-down direction 7 as shown in FIGS. 2 and 7. The upstanding state is the state to be provided in order that the space for the movable unit 69 is decreased on the back surface side of the casing 14 when the bypass tray 70 and the manual feed tray 80 are not used. The movable unit 69, which is in the upstanding state, has the back surface which is substantially parallel to the back surface of the casing 14. The inclined state is the state in which the support surfaces 74, 81 are inclined respectively by inclining the movable unit 69 obliquely upwardly toward the outside of the casing 14, and the bypass tray 70 and the manual feed tray 80 can be used. Whether the movable unit 69 is allowed to be in the upstanding state or the inclined state can be arbitrarily selected in accordance with the operation of a user.

Side walls 86, 87 are provided on the both sides in the left-right direction 9 of the movable unit 69. The side walls 86, 87 cover parts of the both sides in the left-right direction 9 of the fixed unit 68. The driving transmitting unit 79, which is provided on the right side in the left-right direction 9 of the fixed unit 68, is covered with the side wall 86 of the movable unit 69.

A support member 88 and a support member 89 are provided to span the side walls 86, 87 of the movable unit 69. In the inclined state, a support surface 90, which is the upper surface of the support member 88, forms the flat surface which is flush with the support surface 74. In other words, the surface, which is formed by the support surface 74 and the support surface 90, supports the recording paper in the bypass tray 70. Further, in the upstanding state, the support surface 90 is perpendicular to the placement surface for the multifunction machine 10, i.e., the support surface 90 extends in the up-down direction 7 and the left-right direction 9.

The length L1, which is provided in the transport direction of the support surface 90 of the movable unit 69, is longer than the length L2 which is provided in the transport direction of the support surface 74 of the fixed unit 68 (L1>L2). The length, which is obtained by totalizing the length L1 and the length L2, is set in conformity with the size of the recording paper capable of being supported by the bypass tray 70.

As shown in FIG. 2, the support member 89 is provided across a space between the side walls 86 and 87 of the movable unit 69. The support member 89 is rotatably supported by the fixed unit 68 at lower end side thereof and rotatable independently of the movable unit 69. The support member 89 is changeable between an upstanding state in which a support surface 91 upstands in the up-down direction 7 and an inclined state in which the support surface 91 is inclined with respect to the placement surface. When the support member 89 is in the inclined state, the support member 89 is supported by an auxiliary member 120 provided for the fixed unit 68 along the left-right direction 9.

When the support member 89 is in the inclined state, the support surface 91, which is an upper surface of the support member 89, forms a support surface for supporting the recording paper together with the support surface 81. Namely, the support surface formed by the support surface 81 and the support surface 91 supports the recording paper in the manual feed tray 80. Further, in the upstanding state, the support surface 91 is perpendicular to the placement surface for the multifunction machine 10, i.e., the support surface 91 extends in the up-down direction 7 and the left-right direction 9.

The length L3, which is provided in the transport direction of the support surface 91 of the support member 89, is shorter than the length L4 which is provided in the transport direction of the support surface 81 of the fixed unit 68 (L3<L4). The length, which is obtained by totalizing the length L3 and the length L4, is set in conformity with the size of the recording paper capable of being supported by the manual feed tray 80.

The support member 88 is provided with side guides 92. The side guides 92 are separated from each other in the left-right direction 9 to form a pair, and the side guides 92 protrude upwardly from the support surface 90. The side guide 92 has a guide surface which extends in the transport direction of the bypass tray 70, and the side guide 92 guides the end edge of the recording paper supported by the support surface 90 in the transport direction by means of the guide surface. The distance, by which the pair of side guides 92 are separated from each other in the left-right direction 9, is variable. Accordingly, the side guides 92 can guide the end edges of the recording paper sheets having various sizes supported by the support surface 90.

The support member 89 is provided with side guides 93. The side guides 93 are separated from each other in the left-right direction 9 to form a pair, and the side guides 93 protrude upwardly from the support surface 91. The side guide 93 has a guide surface which extends in the transport direction of the manual feed tray 80, and the side guide 93 guides the end edge of the recording paper supported by the support surface 91 in the transport direction by means of the guide surface. The distance, by which the pair of side guides 93 are separated from each other in the left-right direction 9, is variable. Accordingly, the side guides 93 can guide the end edges of the recording paper sheets having various sizes supported by the support surface 91.

A tray cover 94 is provided at the upper end of the support member 88. The tray cover 94 is provided rotatably with respect to the support member 88. The tray cover 94 is a flat plate-shaped member capable of sealing the openings of the bypass tray 70 and the manual feed tray 80 on the upper end sides. As shown in FIGS. 1 and 6, the tray cover 94 is rotatable to arrive at the position at which the openings on the upper end sides of the bypass tray 70 and the manual feed tray 80 are covered for the movable unit 69 in the upstanding state. Further, as shown in FIGS. 2 and 7, the tray cover 94 is rotatable to arrive at the position at which the openings on the upper end sides of the bypass tray 70 and the manual feed tray 80 are opened for the movable unit 69 in the inclined state. At this position, an inner surface of the tray cover 94 extends obliquely upwardly parallel to the support surface 90 of the bypass tray 70, and it is possible to support the upper end side of the recording paper protruding from the support surface 90.

<Interlocking Mechanism 101>

Figure 10:
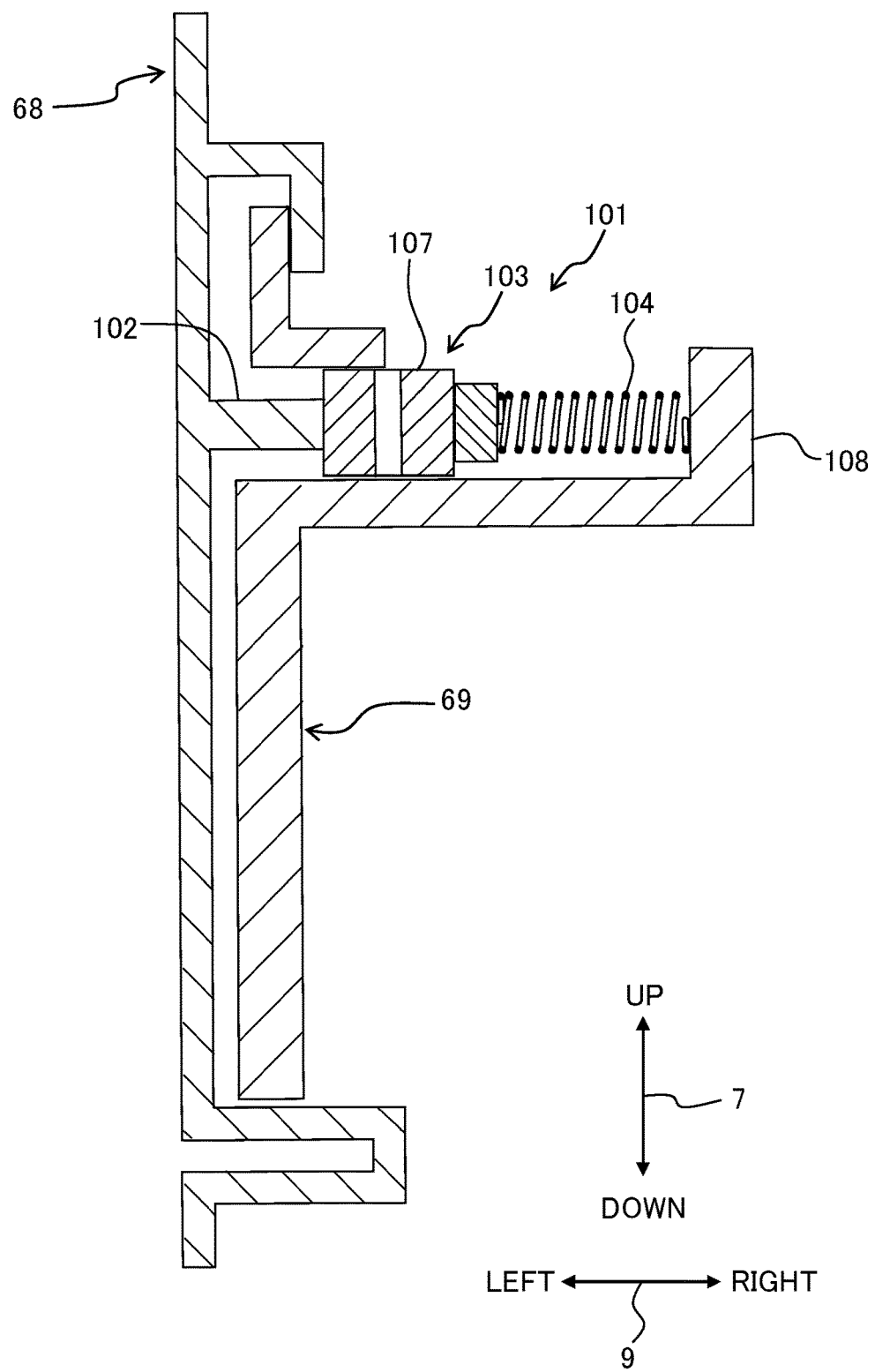
FIG. 10 shows a schematic sectional view illustrating the structure of an interlocking mechanism.
Figure 11:
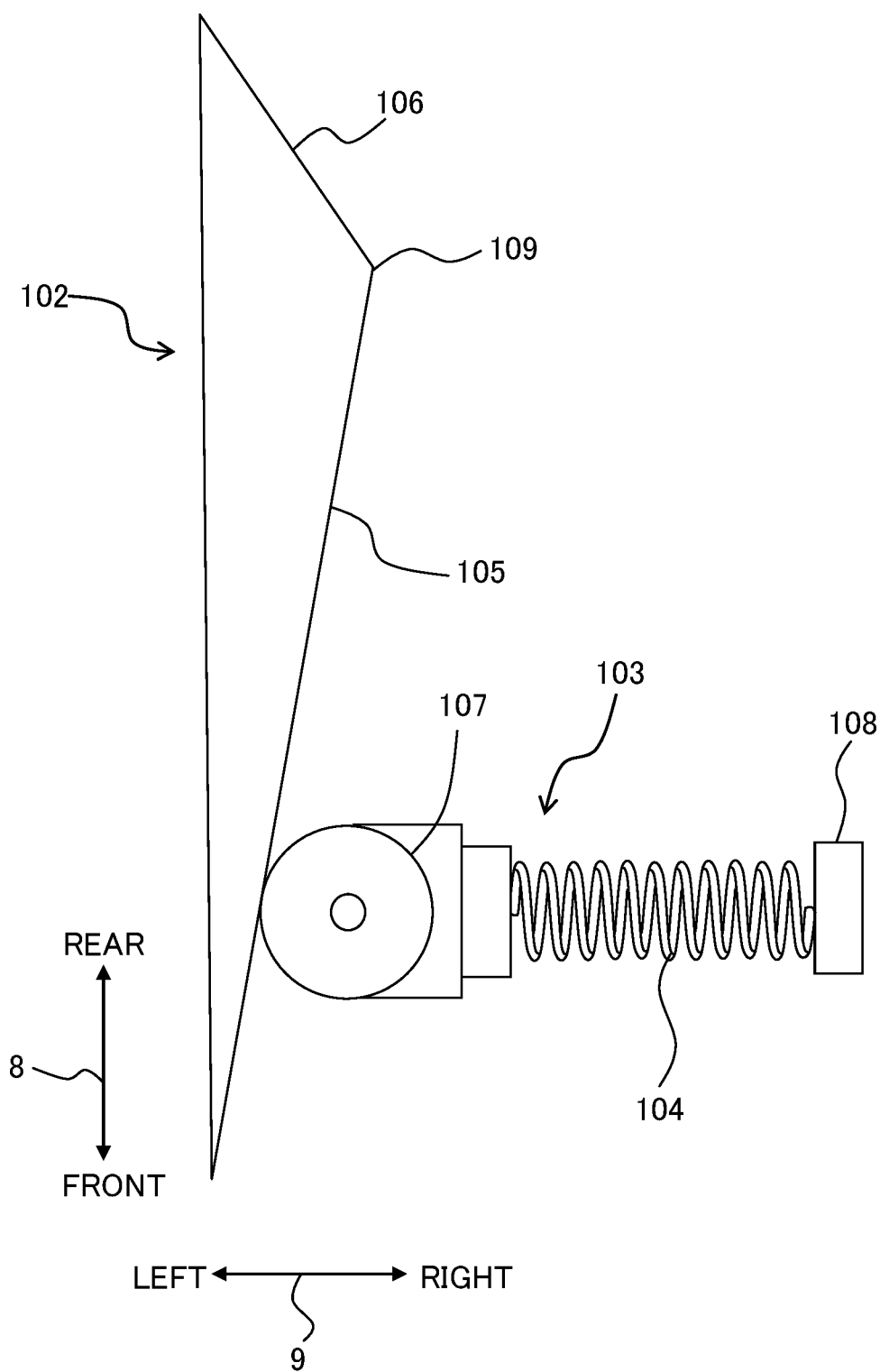
FIG. 11 shows a plan view illustrating the structure of the interlocking mechanism in the upstanding state of the movable unit.

An interlocking mechanism 101 shown in FIGS. 10 and 11 is provided for the fixed unit 68 and the movable unit 69. The interlocking mechanism 101 urges the movable unit 69 as follows by using the boundary of the intermediate state (second state) which is provided between the upstanding state and the inclined state of the movable unit 69. That is, the interlocking mechanism 101 urges the movable unit 69 toward the upstanding state within a range ranging from the upstanding state to the intermediate state, while the interlocking mechanism 101 urges the movable unit 69 toward the inclined state within a range ranging from the intermediate state to the inclined state. The interlocking mechanism 101 corresponds to the urging unit.

The interlocking mechanisms 101 are provided in the vicinity of the side walls 86, 87 of the movable unit 69 respectively. The interlocking mechanisms 101 are constructed linearly symmetrically in the left-right direction 9. Therefore, only the construction of one interlocking mechanism 101 will be explained below.

As shown in FIG. 10, the interlocking mechanism 101 has a cam 102 which is provided for the fixed unit 68, a cam follower 103 which is provided for the movable unit 69, and a coil spring 104 which urges the cam follower 103 toward the cam 102. The coil spring 104 corresponds to the elastic member. The coil spring 104 is provided expandably/contractibly in the left-right direction 9 between the cam follower 103 and a spring seat 108 provided for the movable unit 69. The cam follower 103 and the coil spring 104 are moved in accordance with the rotation of the movable unit 69 with respect to the fixed unit 68.

As shown in FIG. 11, the cam 102 has such a protruding shape that the width of protrusion toward the movable unit 69 is variable along the rotation locus of the movable unit 69. Inclined surfaces 105, 106 are provided at the protruding forward end of the cam 102. Any one of the inclined surfaces 105, 106 is the surface extending in the up-down direction 7.

The inclined surface 105 is the flat surface which is positioned on the front side in the front-rear direction 8 as compared with the inclined surface 106 and which has the front end disposed farther from the spring seat 108 in the left-right direction 9 as compared with the back end. In other words, the inclined surface 105 is the flat surface in which the back side is inclined to bulge or protrude toward the spring seat 108 in the left-right direction 9. The inclined surface 106 is the flat surface which is positioned on the back side in the front-rear direction 8 as compared with the inclined surface 105, which is continued to the inclined surface 105, and which has the front end disposed nearer to the spring seat 108 in the left-right direction 9 as compared with the back end. In other words, the inclined surface 106 is the flat surface in which the back side is inclined to be separated from the spring seat 108 in the left-right direction 9.

The length of the inclined surface 105 in the front-rear direction 8 is longer than the length of the inclined surface 106 in the front-rear direction 8. In other words, the angle, by which the inclined surface 105 is inclined with respect to the front-rear direction 8, is smaller than the angle by which the inclined surface 106 is inclined with respect to the front-rear direction 8. Therefore, the inclination, which is formed by the inclined surface 105 with respect to the cam follower 103, is gentler than that formed by the inclined surface 106.

The boundary between the inclined surface 105 and the inclined surface 106 forms a ridgeline 109 having a protruding shape. The state, in which the cam follower 103 is positioned on (abuts against) the ridgeline 109, is the intermediate state of the movable unit 69. Therefore, the angle of rotation, which is provided between the upstanding state and the intermediate state in the range of rotation of the movable unit 69, is larger than the angle of rotation which is provided between the intermediate state and the inclined state.

The cam follower 103 is movable along the inclined surfaces 105, 106 of the cam 102. The cam follower 103 has a roller 107 which abuts against the inclined surfaces 105, 106. Although not shown in the respective drawings in detail, the shaft or axis of the roller 107 is perpendicular to the rotation locus of the movable unit 69. The roller 107 is moved along the inclined surfaces 105, 106 while being rotated in accordance with the rotation of the movable unit 69.

The coil spring 104 is compressed between the spring seat 108 and the cam follower 103, and the cam follower 103 is urged toward the cam 103 by means of the restoring force of the coil spring 104. The coil spring 104 can be further compressed between the spring seat 108 and the cam follower 103 in accordance with the movement of the cam follower 103 along the cam 102.

The coil spring 104 is most compressed when the roller 107 is positioned on (abuts against) the ridgeline 109, i.e., when the movable unit 69 is in the intermediate state. When the roller 107 abuts against the inclined surface 105, the urging force of the coil spring 104 acts as the force for moving the roller 107 frontward along the inclination, i.e., the force for rotating the movable unit 69 from the intermediate state toward the upstanding state. When the roller 107 abuts against the inclined surface 106, the urging force of the coil spring 104 acts as the force for moving the roller 107 backwardly along the inclination, i.e., the force for rotating the movable unit 69 from the intermediate state toward the inclined state. In other words, the movable unit 69 is rotated while being selectively urged toward the upstanding state or the inclined state by using the intermediate state as the boundary.

<Interlock Between Manuscript Cover 17 and Movable Unit 69>

Figure 14:
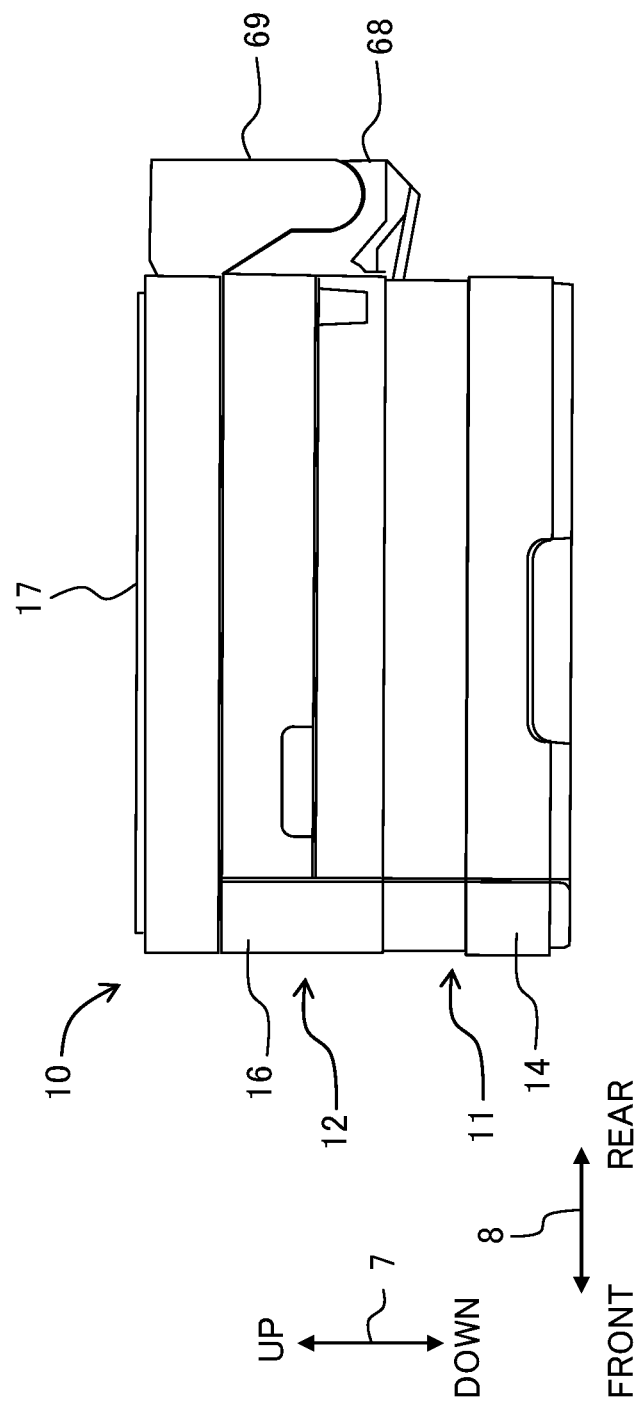
FIG. 14 shows a side view illustrating the multifunction machine in which the manuscript cover is closed and the movable unit is in the upstanding state.
Figure 15:
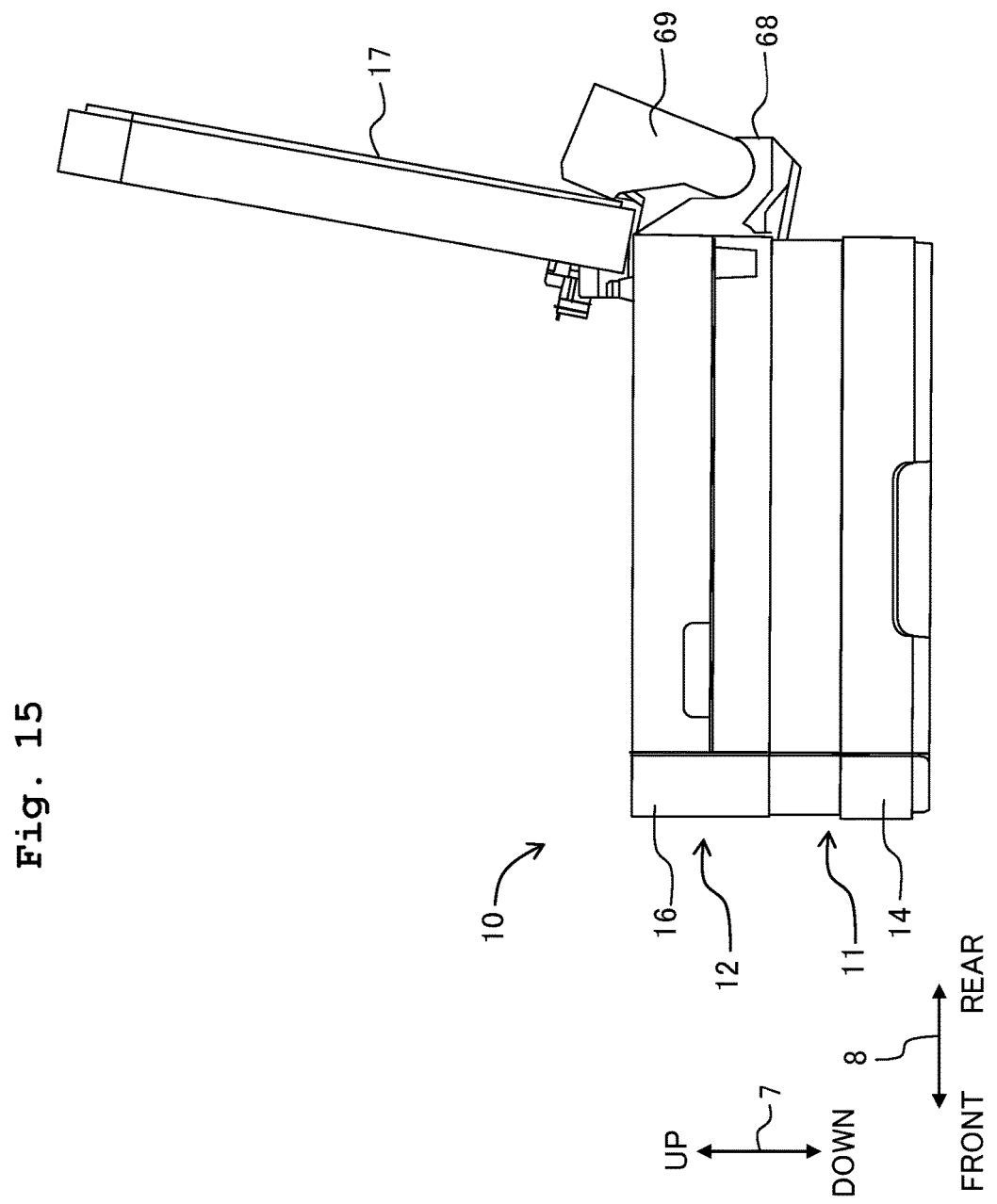
FIG. 15 shows a side view illustrating the multifunction machine in a state in which the movable unit follows the open manuscript cover.

When the manuscript cover 17 is opened as shown in FIG. 15 as starting from the state in which the manuscript cover 17 is closed for the scanner unit 12 as shown in FIG. 14, the upper surface of the manuscript cover 17 abuts against the movable unit 69 in the upstanding state. In other words, the upper surface of the manuscript cover 17 is moved backwardly in accordance with the rotation in the opening direction as compared with the closed state. The movable unit 69 in the upstanding state is disposed adjacently to the upper surface of the manuscript cover 17 in the closed state. Therefore, when the upper surface of the manuscript cover 17 is moved backwardly, then the upper surface of the manuscript cover 17 abuts against the movable unit 69, and the movable unit 69 in the upstanding state is pushed down toward the inclined state.

Figure 12:
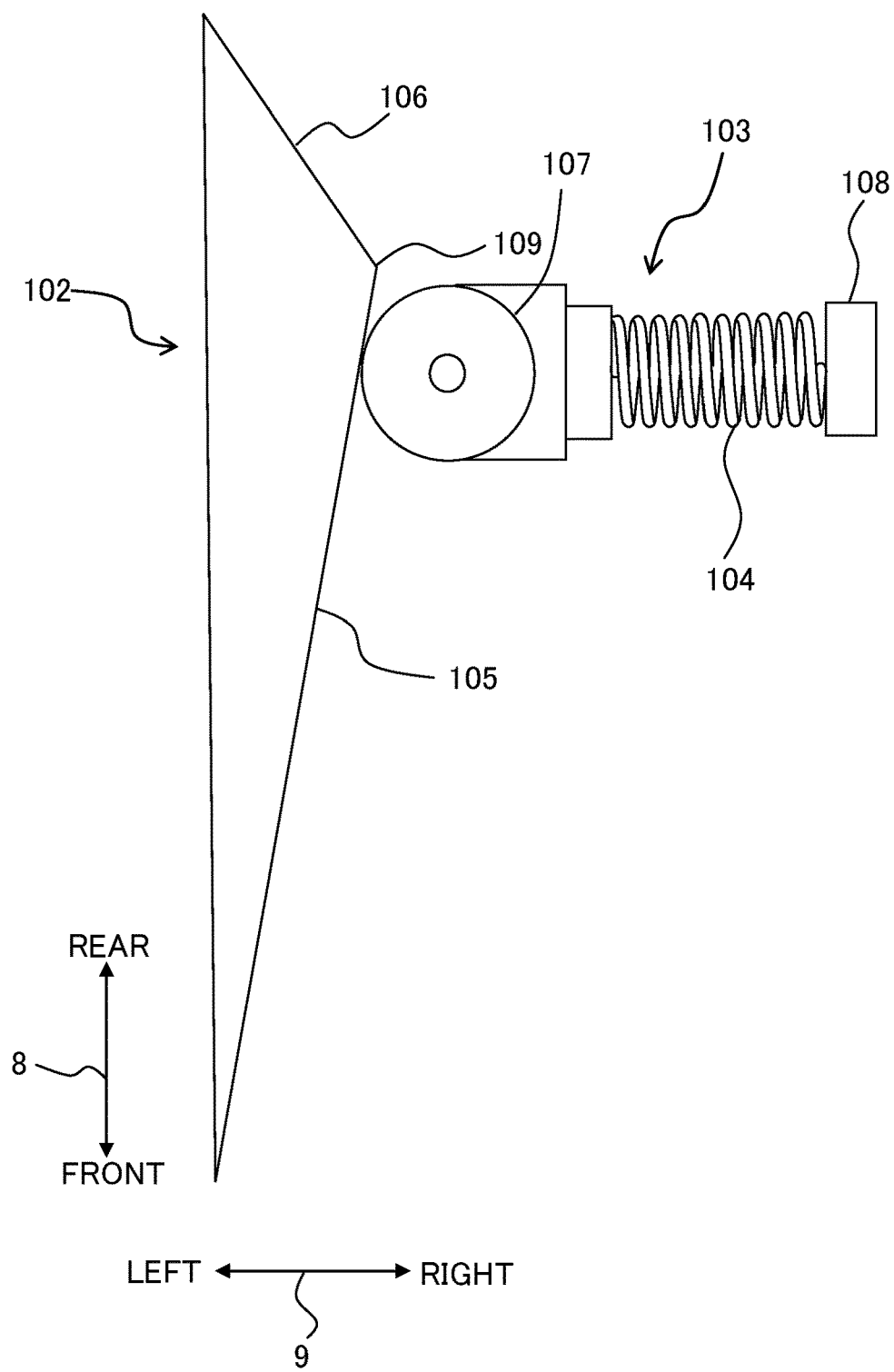
FIG. 12 shows a plan view illustrating the structure of the interlocking mechanism when the movable unit is rotated toward the intermediate state while following a manuscript cover.

The roller 107 of the cam follower 103 is moved from the front end side to the back end side of the inclined surface 105, i.e., toward the inclined surface 106 in accordance with the rotation of the movable unit 69. The cam follower 103 is moved to inner side in relation to the left-right direction 9, namely central side of the movable unit 69 in relation to the left-right direction 9, against the urging force of the coil spring 104 in accordance with the movement. The roller 107 is moved frontward from the ridgeline 109 as shown in FIG. 12, and the roller 107 abuts against the inclined surface 105 in the state in which the manuscript cover 17 is fully open as shown in FIG. 15. In other words, the movable unit 69 is not rotated until arrival at the intermediate state. Therefore, in the state in which the manuscript cover 17 is fully open, the movable unit 69 is urged to the upstanding state by means of the urging force of the coil spring 104, and the movable unit 69 is maintained in the state in which the movable unit 69 abuts against the upper surface of the manuscript cover 17.

When the manuscript cover 17 is closed from the state in which the manuscript cover 17 is fully open, the movable unit 69, which is urged to the upstanding state, is restored to the upstanding state while following the manuscript cover 17. In this way, the movable unit 69 is rotated while following the manuscript cover 17 between the upstanding state and the intermediate state in accordance with the opening/closing operation of the manuscript cover 17.

Figure 13:
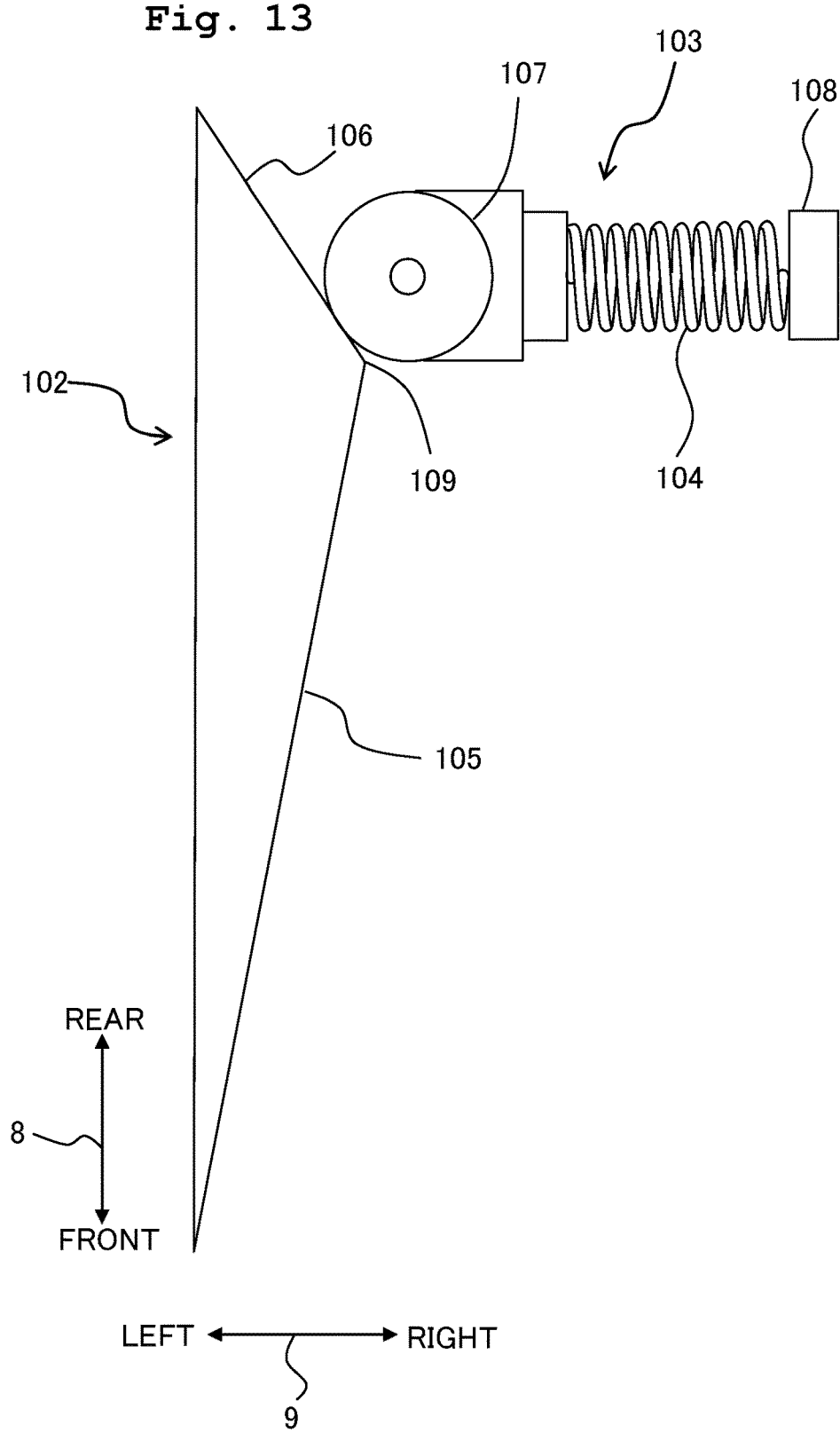
FIG. 13 shows a plan view illustrating the structure of the interlocking mechanism in the inclined state of the movable unit.
Figure 16:
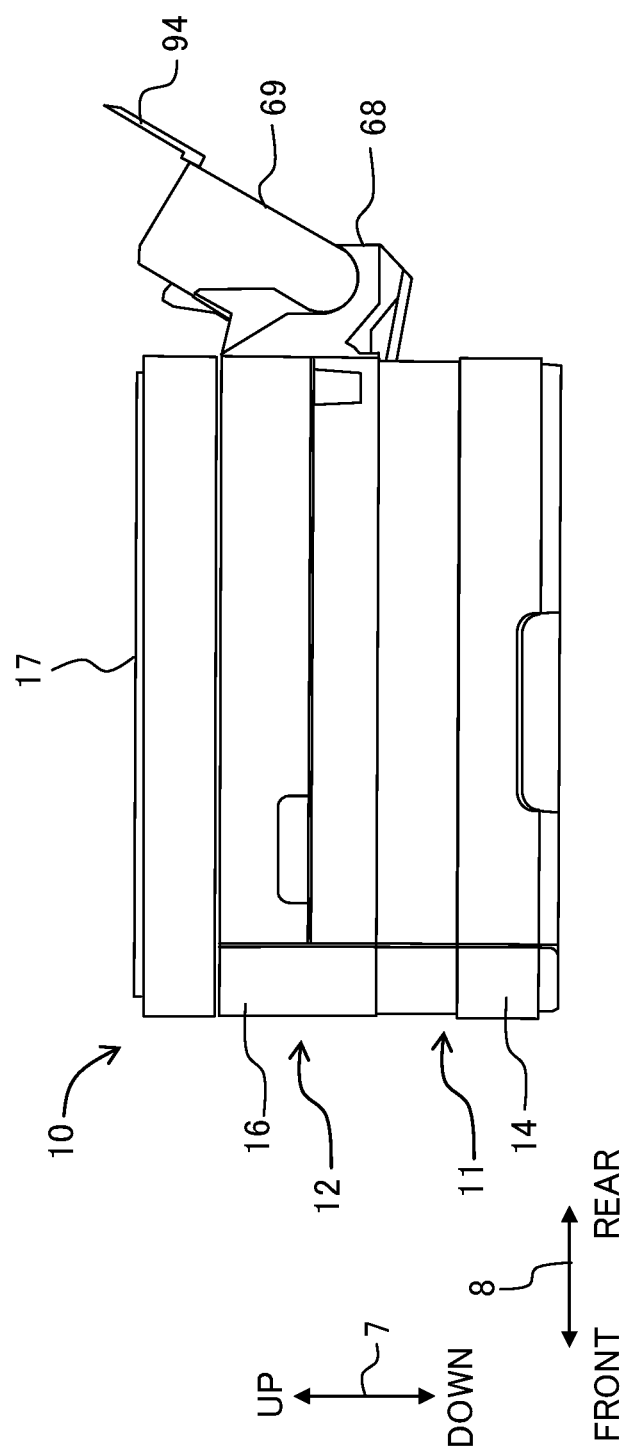
FIG. 16 shows a side view illustrating the multifunction machine in which the manuscript cover is closed and the movable unit is in the inclined state.

When the movable unit 69 is rotated by the user from the upstanding state to the inclined state beyond the intermediate state in the state in which the manuscript cover 17 is closed as shown in FIG. 16, then the roller 107 of the cam follower 103 is moved backwardly from the ridgeline 109, and the roller 107 of the cam follower 103 abuts against the inclined surface 106 as shown in FIG. 13. Therefore, the movable unit 69 is urged to the inclined state by means of the urging force of the coil spring 104, and the movable unit 69 is maintained in the inclined state.

When the movable unit 69 is rotated by the user from the inclined state to the upstanding state beyond the intermediate state in the state in which the manuscript cover 17 is closed, then the roller 107 of the cam follower 103 is moved frontward from the ridgeline 109, and the roller 107 of the cam follower 103 abuts against the inclined surface 105 as shown in FIG. 11. Therefore, the movable unit 69 is urged to the upstanding state by means of the urging force of the coil spring 104, and the movable unit 69 is maintained in the upstanding state.

<Operation of Printer Unit 11>

An explanation will be made below about the operation of the printer unit 11 as performed when the feed tray 20, the bypass tray 70, and the manual feed tray 80 are used respectively.

When the bypass tray 70 and the manual feed tray 80 are not used, the movable unit 69 is in the upstanding state as shown in FIGS. 1 and 6. Accordingly, the projected area of the movable unit 69 is decreased. Therefore, it is possible to decrease the space on the back surface side of the multifunction machine 10. Further, the tray cover 94 is rotated to the position at which the openings at the upper ends of the bypass tray 70 and the manual feed tray 80 are closed. If an enough space is provided on the back surface side of the multifunction machine 10, it is also allowable that the movable unit 69 is still in the inclined state even when the bypass tray 70 and the manual feed tray 80 are not used.

When the feed tray 20 is used, the recording paper having a desired size is set to the feed tray 20. Specifically, a plurality of recording paper sheets is placed on the feed tray 20 in a state in which the plurality recording paper sheets are stacked. The feed tray 20, on which the recording paper sheets are placed, is allowed to be in a state of being inserted into the casing 14 through the opening 13. In this state, the feed roller 25 abuts against the uppermost recording paper sheet of the plurality of recording paper sheets placed on the feed tray 20. The printer unit 11 determines or decides the feeding of the recording paper from the feed tray 20 on the basis of, for example, the input by the user and/or the printing data.

If the instruction to start the printing is accepted, the printer unit 11 drives the unillustrated motor to rotate the feed roller 25, the first transport roller pair 54, and the second transport roller pair 55 at predetermined timings. The uppermost recording paper sheet is fed from the paper feed tray 20 to the transport path 65 in response to the rotation of the feed roller 25. The recording paper is guided by the curved passage 65A of the transport path 65, and the recording paper arrives at the first transport roller pair 54. The ink droplets are discharged from the recording head 39 and a desired image is recorded on the recording paper transported to the recording unit 24 by being interposed by the first transport roller pair 54. The recording paper, for which the image recording has been completed, is discharged to the discharge tray 21 by means of the second transport roller pair 55.

When the bypass tray 70 and the manual feed tray 80 are used, the movable unit 69 is allowed to be in the inclined state as shown in FIGS. 2 and 7. Accordingly, the support surfaces 74, 90 form one flat surface in the bypass tray 70, and the support surfaces 81, 91 integrally form a support surface for the recording paper in the manual feed tray 80. The tray cover 94 is rotated to the position at which the openings on the upper end sides of the bypass tray 70 and the manual feed tray 80 are open.

When the bypass tray 70 is used, the recording paper having a desired size is set to the bypass tray 70. Specifically, a plurality of recording paper sheets is supported by the support surfaces 74, 90 of the bypass tray 70 in a state in which the plurality of recording paper sheets are stacked. In this state, the feed roller 76 of the bypass tray 70 abuts against the uppermost recording paper sheet of the plurality of recording paper sheets supported by the support surfaces 74, 90. Further, the lower ends of the plurality of recording paper sheets abut against the separation tab 72. The printer unit 11 determines or decides the feeding of the recording paper from the bypass tray 70 on the basis of, for example, the input by the user and/or the printing data.

If the instruction to start the printing is accepted, the printer unit 11 drives the unillustrated motor to rotate the feed roller 76, the first transport roller pair 54, and the second transport roller pair 55 at predetermined timings. The uppermost recording paper sheet is fed from the bypass tray 70 to the bypass route 66 in response to the rotation of the feed roller 76. The recording paper enters the straight passage 65B of the transport path 65 from the bypass route 66, and the recording paper arrives at the first transport roller pair 54. During this process, the outer guide member 18, the back surface cover 22 and the guide member 31, which form the bypass route 66 and the straight passage 65B, guide the recording paper toward the first transport roller pair 54. The ink droplets are discharged from the recording head 39 and a desired image is recorded on the recording paper transported to the recording unit 24 by being interposed by the first transport roller pair 54. The recording paper, for which the image recording has been completed, is discharged to the discharge tray 21 by means of the second transport roller pair 55.

When the manual feed tray 80 is used, the recording paper having a desired size is set to the manual feed tray 80. Specifically, one recording paper sheet is placed on the support surfaces 81, 91 of the manual feed tray 80, and the recording paper sheet is inserted into the space between the first transport roller pair 54 and the feed roller 76 of the bypass tray 70 along the support surfaces 81, 91. Specifically, the recording paper sheet is inserted so that the forward end of the recording paper enters the transport path 65 from the bypass route 66 until the forward end of the recording paper abuts against the first transport roller pair 54. The support surfaces 81, 91 of the manual feed tray 80 support the recording paper at the lower positions in a state in which the recording paper is inserted until the forward end of the recording paper abuts against the first transport roller pair 54. The printer unit 11 determines or decides the feeding of the recording paper from the manual feed tray 80 on the basis of, for example, the input by the user and/or the printing data. The printer unit 11 may determine or decide the feeding of the recording paper from the manual feed tray 80 on the basis of the fact that a sensor 56, which is arranged on the upstream side in the transport direction of the first transport roller pair 54, detects the recording paper set in the manual feed tray 80.

If the instruction to start the printing is accepted, the printer unit 11 drives the unillustrated motor to rotate the first transport roller pair 54 and the second transport roller pair 55 at predetermined timings. The recording paper sheet, which is set to the manual feed tray 80, is interposed by the first transport roller pair 54 in accordance with the rotation of the first transport roller 60. The ink droplets are discharged from the recording head 39 and a desired image is recorded on the recording paper transported to the recording unit 24. The recording paper, for which the image recording has been completed, is discharged to the discharge tray 21 by means of the second transport roller pair 55.

Effect of Embodiment

According to this embodiment, the movable unit 69 is rotated between the upstanding state and the intermediate state while following the manuscript cover 17 which is to be opened/closed. Therefore, the small-sized multifunction machine 10 is realized, which has the bypass tray 70 constructed by the movable unit 69 and the manuscript cover 17 subjected to the state change.

The interlocking mechanism 101 is constructed by the cam 102 which is provided for the fixed unit 68, the cam follower 103 which is provided for the movable unit 69, and the coil spring 104 which urges the cam follower 103 toward the cam 102. Therefore, the interlocking mechanism 101 is realized by the simple and convenient construction.

As for the movable unit 69, the angle of rotation between the upstanding state and the intermediate state is larger than the angle of rotation between the intermediate state and the inclined state. Therefore, the range, in which the movable unit 69 can follow the manuscript cover 17, is increased. Accordingly, it is possible to increase the range of rotation of the manuscript cover 17.

The manuscript cover 17 is arranged over or above the casings 14, 16. Therefore, it is easy to operate the manuscript cover 17. Further, the bypass tray 70 and the manual feed tray 80 are arranged at the backward of the manuscript cover 17, and the rotational shaft (rotation axis) of the manuscript cover 17 is also provided at the backward. Therefore, the user can access the casing 16, i.e., the platen glass 30 from the frontward of the manuscript cover 17 by opening the manuscript cover 17. Further, the movable unit 69, which is rotated while following the manuscript cover 17, is not rotated toward the user who operates the manuscript cover 17 from the frontward. Further, the recording paper is transported from the bypass tray 70 and the manual feed tray 80 toward the frontward of the casing 14. Therefore, the user can access the recording paper after the transport from the frontward of the casing 14.

In relation to the construction in which the flatbed scanner of relatively high frequency of use is provided as provided for the multifunction machine 10 according to the embodiment of the present invention, it is possible to arrange the bypass tray 70 and the manual feed tray 80 within the range of rotation of the manuscript cover 17.

As for the movable unit 69, the support surfaces 74, 81, 90, 91 upstand while approaching the back surface of the casing 14 in the upstanding state, and the support surfaces 74, 81, 90, 91 are inclined in the direction to make separation from the back surface of the casing 14 in the inclined state. Therefore, the movable unit 69 in the upstanding state can be efficiently made to be small-sized.

The movable unit 69 is provided with the bypass tray 70 and the manual feed tray 80. Therefore, it is possible to arrange these components within the range of rotation of the manuscript cover 17.

The fixed unit 68 is provided with the feed roller 76, the arm 78, and the driving transmitting unit 79 which feed the recording paper supported by the bypass tray 70 to the bypass route 66. Therefore, the driving force transmission to the feed roller 76 is stabilized.

The tray cover 94 is provided to cover the upper end side of the movable unit 69 in the upstanding state. Therefore, any dust is prevented from entering the interior of the casing 14 via the opening 67.

Second Embodiment

Figure 17:
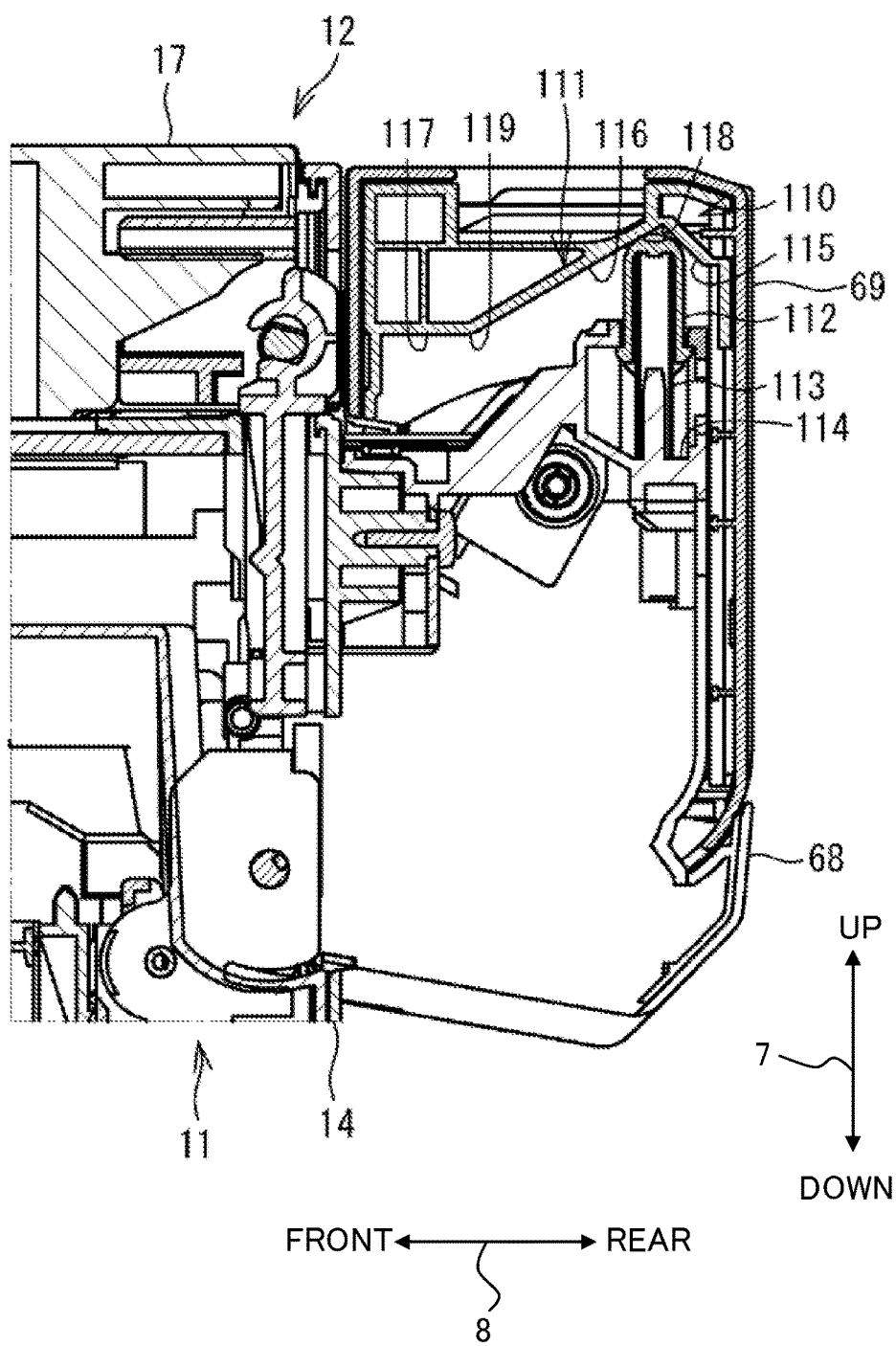
FIG. 17 shows an enlarged sectional view illustrating the multifunction machine according to second embodiment in which the manuscript cover is closed and the movable unit is in the upstanding state.
Figure 18:
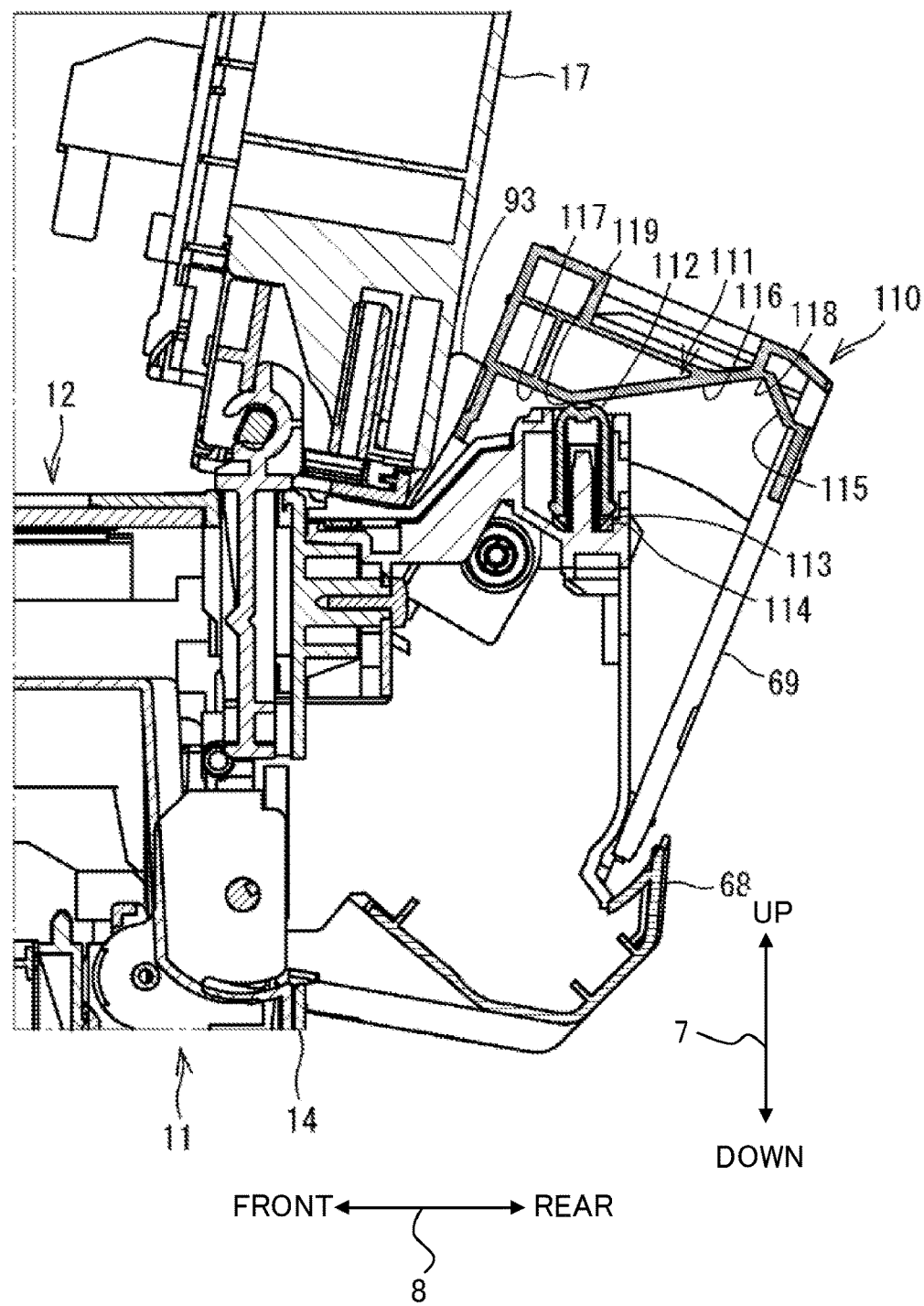
FIG. 18 shows an enlarged sectional view illustrating the multifunction machine according to the second embodiment in a state in which the movable unit follows the open manuscript cover.
Figure 19:
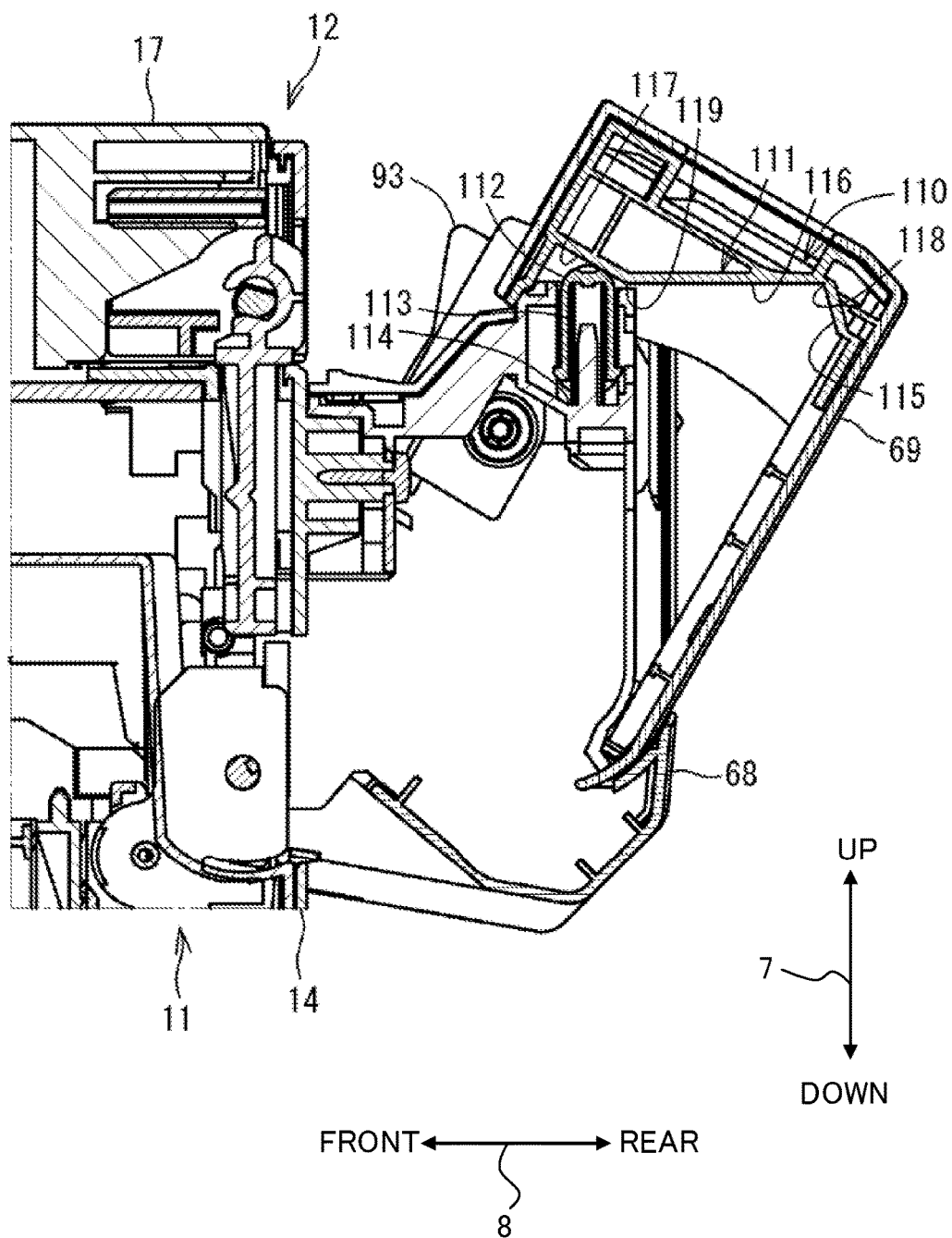
FIG. 19 shows an enlarged sectional view illustrating the multifunction machine according to the second embodiment in which the manuscript cover is closed and the movable unit is in the inclined state.

An explanation will be made about the second embodiment of the present invention below. The second embodiment is different from the first embodiment described above in that an interlocking mechanism 110 is provided instead of the interlocking mechanism 101. Accordingly, an explanation will be made mainly about a structure of the interlocking mechanism 110 below, and explanations about other components will be omitted. In the second embodiment, the components having structures which are same as or equivalent to those of the first embodiment described above are designated by the same reference signs As shown in FIGS. 17 to 19, the interlocking mechanism 110 is provided for the fixed unit 68 and the movable unit 69. The interlocking mechanism 110 urges the movable unit 69 as follows by using the intermediate state (second state), which is provided between the upstanding state and the inclined state of the movable unit 69, as the boundary. That is, the interlocking mechanism 110 urges the movable unit 69 toward the upstanding state within a range ranging from the upstanding state to the intermediate state, while the interlocking mechanism 110 urges the movable unit 69 toward the inclined state within a range ranging from the intermediate state to the inclined state. The interlocking mechanism 110 corresponds to the urging unit.

The interlocking mechanisms 110 are provided in the vicinity of the side walls 86, 87 of the movable unit 69 respectively. The interlocking mechanisms 110 are constructed linearly symmetrically in the left-right direction 9. Therefore, only the construction of one interlocking mechanism 110 will be explained below.

The interlocking mechanism 110 has a cam 111 which is provided for the movable unit 69, a cam follower 112 which is provided for the fixed unit 68, and a coil spring 113 which urges the cam follower 112 toward the cam 111. The coil spring 113 corresponds to the elastic member. The coil spring 113 is provided expandably/contractibly in the up-down direction 7 between the cam follower 112 and a spring seat 114 provided for the fixed unit 68. The cam 111 is moved in accordance with the rotation of the movable unit 69 with respect to the fixed unit 68.

The cam 111 extends in the front-rear direction 8 in the movable unit 69 and is displaced in the front-rear direction 8 with respect to the fixed unit 68. A lower surface of the cam 111 in the up-down direction 7 acts as a cam surface. The cam surface is formed by a first cam surface 115, a second cam surface 116, and a third cam surface 117 arranged in this order from the rear side of the front-rear direction 8.

As shown in FIG. 17, in a state that the movable unit 69 is in the upstanding state, the first cam surface 115 is positioned in the movable unit 69 on the rear side of the front-rear direction 8. The front end of the first cam surface 115 is disposed above the back end of the first cam surface 115 and farther from the spring seat 114 in the up-down direction 7 as compared with the back end of the first cam surface 115. In other words, the first cam surface 115 is a flat surface which is inclined such that the front end is disposed farthest from the spring seat 114 in the up-down direction 7.

The second cam surface 116 is positioned in the center of the movable unit 69 in the front-rear direction 8. The front end of the second cam surface 116 is disposed below the back end of the second cam surface 116 and nearer to the spring seat 114 in the up-down direction 7 as compared with the back end of the second cam surface 116. In other words, the second cam surface 116 is a flat surface which is inclined such that the front end of the second cam surface 116 is disposed nearest to the spring seat 114 in the up-down direction 7. The front end of the first cam surface 115 is continuous with the back end of the second cam surface 116, and the boundary between the first cam surface 115 and the second cam surface 116 forms a ridgeline 118 protruding upwardly in the up-down direction 7. The ridge line 118 is disposed farthest from the spring seat 114 in the first cam surface 115 and the second cam surface 116.

The third cam surface 117 is positioned in the movable unit 69 on the front side of the front-rear direction 8. The front end of the third cam surface 117 is disposed farther from the spring seat 114 in the front-rear direction 8 as compared with the back end of the third cam surface 117. In the state that the movable unit 69 is in the upstanding state, the front end and the back end of the third cam surface 117 are disposed at substantially same positions in the up-down direction 7. In a state that the movable unit 69 is in the inclined state (see FIG. 19), the third cam surface 117 is a flat surface which is inclined such that the front end of the third cam surface 117 is disposed farthest from the spring seat 114 in the up-down direction 7. The front end of the second cam surface 116 is continuous with the back end of the third cam surface 117, and the boundary between the second cam surface 116 and the third cam surface 117 forms a ridgeline 119 protruding downwardly in the up-down direction 7. The ridge line 119 is disposed nearest to the spring seat 114 in the second cam surface 116 and the third cam surface 117. The state, in which the cam follower 112 is positioned on (abuts against) the ridgeline 119, is the intermediate state of the movable unit 69. The front end of the third cam surface 117 extends up to an inner wall of the movable unit 69.

The cam follower 112 is movable along the first cam surface 115, the second cam surface 116 and the third cam surface 117 of the cam 111. An upper end of the cam follower 112 is rounded in a dome shape.

The coil spring 113 is compressed between the spring seat 114 and the cam follower 112, and the cam follower 112 is urged toward the cam 111 by means of the restoring force of the coil spring 113. The coil spring 113 can be further compressed between the spring seat 114 and the cam follower 112 in accordance with the movement of the cam follower 112 along the cam 111.

The coil spring 113 is most expanded, when the upper end of the cam follower 112 abuts against the first cam surface 115 and the second cam surface 116 and is positioned to face the ridgeline 118. The coil spring 113 is most compressed when the upper end of the cam follower 112 is positioned on (abuts against) the ridgeline 119. When the upper end of the cam follower 112 abuts against the second cam surface 116, the urging force of the coil spring 113 acts as the force for rotating the movable unit 69 from the intermediate state toward the upstanding state. When the upper end of the cam follower 112 abuts against the third cam surface 117, the urging force of the coil spring 113 acts as the force for rotating the movable unit 69 from the intermediate state toward the inclined state. In other words, the movable unit 69 is rotated while being selectively urged toward the upstanding state or the inclined state by using the intermediate state as the boundary.

As shown in FIG. 2, the support member 89 is provided across a space between the side walls 86 and 87 of the movable unit 69, although the support member 89 is not shown in FIGS. 17 to 19. The support member 89 is rotatably supported by the fixed unit 68 at lower end side thereof and rotatable independently of the movable unit 69. The support member 89 is changeable between an upstanding state in which a support surface 91 upstands in the up-down direction 7 and an inclined state in which the support surface 91 is inclined with respect to the placement surface. When the support member 89 is in the inclined state, the support member 89 is supported by an auxiliary member 120 provided for the fixed unit 68 along the left-right direction 9. Side guides 93 are provided for the support member 89 on a side of the support surface 91.

<Interlock Between Manuscript Cover 17 and Movable Unit 69>

When the manuscript cover 17 is opened as shown in FIG. 18 as starting from the state in which the manuscript cover 17 is closed for the scanner unit 12 as shown in FIG. 17, the rear surface side of the manuscript cover 17 abuts against the movable unit 69 in the upstanding state. In other words, the rear surface of the manuscript cover 17 is moved backwardly in accordance with the rotation in the opening direction as compared with the closed state. The movable unit 69 in the upstanding state is disposed adjacently to the rear surface of the manuscript cover 17 in the closed state. Therefore, when the rear surface of the manuscript cover 17 is moved backwardly, then the rear surface of the manuscript cover 17 abuts against the movable unit 69, and the movable unit 69 in the upstanding state is pushed down toward the inclined state.

The upper end of the cam follower 112 is moved from the position facing the ridgeline 118 to the front end side of the second cam surface 116, i.e., toward the ridge line 119 in accordance with the rotation of the movable unit 69. The cam follower 112 is moved downwardly in the up-down direction 7, against the urging force of the coil spring 113 in accordance with the movement. The upper end of the cam follower 112 is positioned behind the ridge line 119 and abuts against the second cam surface 116 in the state in which the manuscript cover 17 is fully open as shown in FIG. 18. In other words, the movable unit 69 is not rotated until arrival at the intermediate state. Therefore, in the state in which the manuscript cover 17 is fully open, the movable unit 69 is urged to the upstanding state by means of the urging force of the coil spring 113, and the movable unit 69 is maintained in the state in which the movable unit 69 abuts against the rear surface of the manuscript cover 17.

In the state in which the manuscript cover 17 is fully open, the manuscript cover 17 abuts against the side guides 93 provided for the support member 88 in the inclined state. Thus, the manuscript cover 17 does not abut against the recording paper sheets placed on the manual feed tray 80. In the state in which the manuscript cover 17 is fully open, the manuscript cover 17 is supported by the fixed unit 68 via the side guides 93 and the auxiliary member 120.

When the manuscript cover 17 is closed from the state in which the manuscript cover 17 is fully open, the movable unit 69, which is urged toward the upstanding state, is restored to the upstanding state while following the manuscript cover 17. In this way, the movable unit 69 is rotated while following the manuscript cover 17 between the upstanding state and near side of the intermediate state in accordance with the opening/closing operation of the manuscript cover 17.

When the movable unit 69 is rotated by the user from the upstanding state to the inclined state beyond the intermediate state in the state in which the manuscript cover 17 is closed as shown in FIG. 19, then the upper end of the cam follower 112 is moved forward from the ridgeline 119, and the upper end of the cam follower 112 abuts against the third cam surface 117. Therefore, the movable unit 69 is urged toward the inclined state by means of the urging force of the coil spring 113, and the movable unit 69 is maintained in the inclined state.

When the movable unit 69 is rotated by the user from the inclined state to the upstanding state beyond the intermediate state in the state in which the manuscript cover 17 is closed, then the upper end of the cam follower 112 is moved backward from the ridgeline 119, and the upper end of the cam follower 112 abuts against the second cam surface 116 as shown in FIG. 17. Therefore, the movable unit 69 is urged to the upstanding state by means of the urging force of the coil spring 113, and the movable unit 69 is maintained in the upstanding state.

Modified Embodiments

The foregoing embodiment is illustrative of the multi-function machine 10 having such a construction that the manuscript cover 17, which is rotatably provided for the casing 16, abuts against the movable unit 69, and the movable unit 69 follows the opening/closing of the manuscript cover 17. However, the construction of the apparatus, to which the present invention is applicable, is not limited thereto. For example, the apparatus may be constructed as follows in an embodiment in which the scanner unit 12 is not provided and the image recording apparatus is constructed by only the printer unit 11. That is, the casing 16, which is arranged as an upper cover on the upper side of the casing 14, is rotatable so that the upper side of the casing 14 can be opened or released in order to dissolve the paper jamming and/or perform the maintenance. In the embodiment as described above, the construction is made such that the movable unit 69 is arranged within the range of rotation of the casing 16, and the movable unit 69 follows the rotation of the casing 16.

Figure 20:
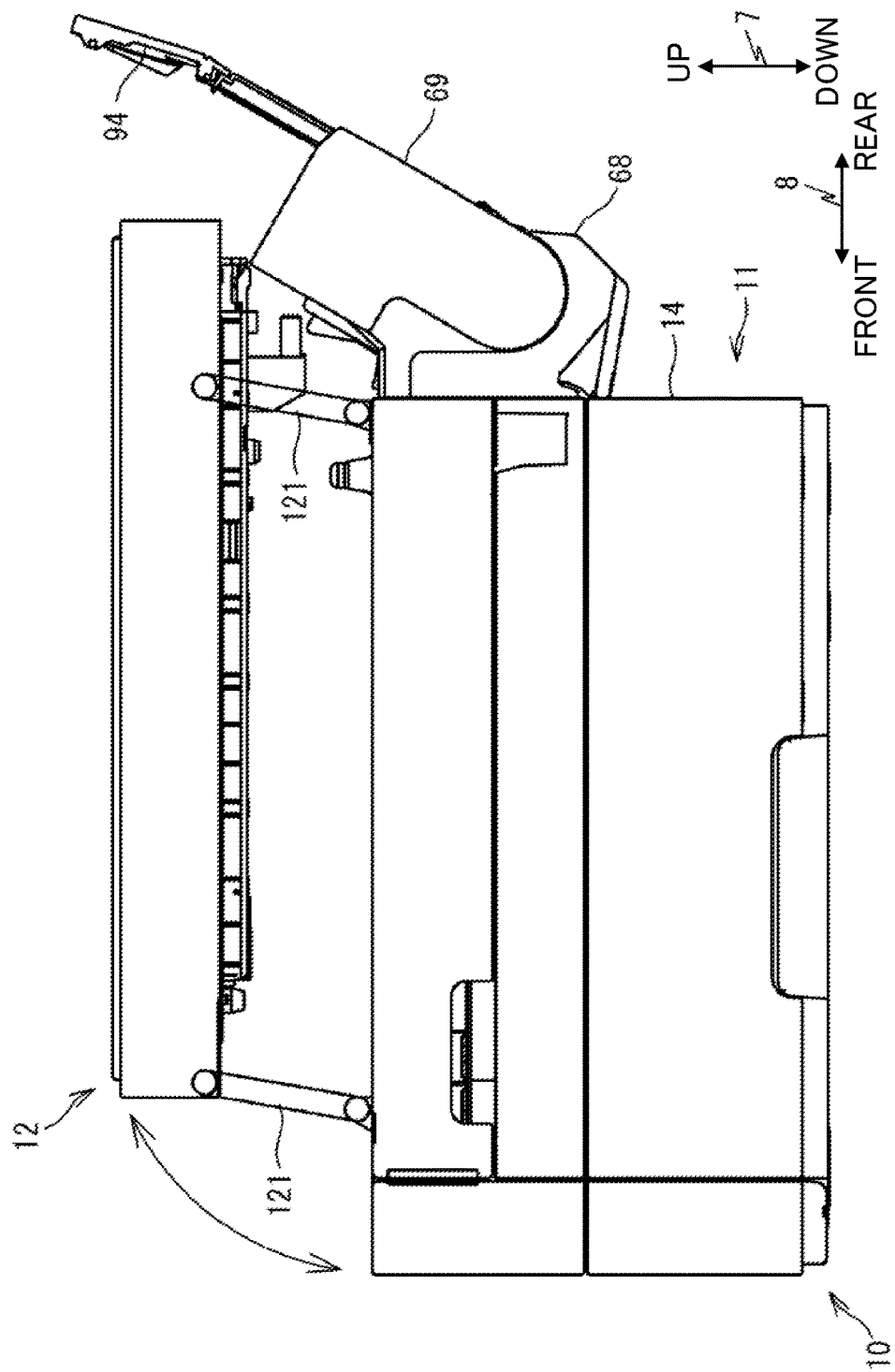
FIG. 20 shows a side view illustrating a modified example in which a scanner unit is configured to be movable with respect to a printer unit by a parallel link.

Further, for example, the scanner unit 12 may be provided movable with respect to the printer unit 11 for handling of a paper jam in the printer unit 11 and maintenance of the printer unit 11. In such a structure, it is not necessary for the scanner unit 12 to be rotatable with respect to the printer unit 11, and the scanner unit 12 may be constructed to be movable with respect to the printer unit 11. For example, as shown in FIG. 20, the scanner unit 12 may be constructed to be movable parallel to the printer unit 11 upward in the up-down direction 7 and backward in the front-rear direction 9. In the embodiment in which the scanner unit 12 abuts against the movable unit 69 in the parallel movement of the scanner unit 12, the same effects as those of the first and second embodiments can be achieved successfully.

The construction of the interlocking mechanism is not limited to the foregoing embodiment. Any construction other than the construction of the foregoing embodiment may be adopted provided that the interlocking mechanism is such a mechanism that the urging force is applied in the direction in which the movable unit is moved toward any one of the upstanding state and the inclined state in accordance with the movement of the movable unit.

In the foregoing embodiment, the bypass tray 70 and the manual feed tray 80 are constructed by the fixed unit 68 and the movable unit 69. However, the movable unit 69 may be rotatably supported directly by the casing 16, and the bypass tray 70 and the manual feed tray 80 may be constructed by only the movable unit 69.

What is claimed is:

1. A sheet transport apparatus comprising:
   a first casing having a first end portion, a second end portion which is separated from the first end portion in a predefined direction, and a transport path for transporting a sheet;
   a second casing having a third end portion and a fourth end portion which is separated from the third end portion in the predefined direction, the second casing being moveable with respect to the first casing between a closed position and a fully-opened position, the closed position being a position at which the third end portion of the second casing is disposed nearest to the first end portion of the first casing, the fully-opened position being a position at which the third end portion of the second casing is disposed furthest from the first end portion of the first casing;
   a sheet support unit which is rotatably provided for the first casing such that the second end portion of the first casing is disposed between the first end portion of the first casing and the sheet support unit in the predefined direction, the sheet support unit being configured to be changeable between a first position, a second position, and a third position in such an order that a rotation forward end of the sheet support unit is disposed nearer to the second casing, and being configured to support the sheet to be fed to the transport path at least in the third state; and
   an urging unit configured to urge the sheet support unit toward the first position within a range ranging from the first position to the second position and to urge the sheet support unit toward the third position within a range ranging from the second position to the third position,
   wherein the sheet support unit in the first position is configured to follow the second casing in accordance with abutment of the second casing which is moved from the closed position to the fully-opened position, and
   in a state that the second casing is positioned in the fully-opened position, the sheet support unit is positioned between the first position and the second position.

2. The sheet transport apparatus according to claim 1, wherein the second casing is configured to pivot between the closed position and the fully-opened position around the fourth end portion.

3. The sheet transport apparatus according to claim 1, wherein the second casing is moveable with respect to the first casing such that a distance between the first end of the first casing and the third end of the second casing is same as a distance between the second end of the first casing and the fourth end of the second casing.

4. The sheet transport apparatus according to claim 1, further comprising a transport unit configured to transport the sheet along the transport path.

* * * * *